United States Patent [19]

Rhodes et al.

[11] Patent Number: 5,572,232
[45] Date of Patent: Nov. 5, 1996

[54] METHOD AND APPARATUS FOR DISPLAYING AN IMAGE USING SUBSYSTEM INTERROGATION

[75] Inventors: Ken Rhodes, Portland; Rohan Coelho, Hillsboro; Davis Frank; Blake Bender, both of Beaverton, all of Oreg.

[73] Assignee: Intel Corporation, Santa Clara, Calif.

[21] Appl. No.: 103,261

[22] Filed: Aug. 6, 1993

[51] Int. Cl.⁶ .............................. G09G 5/04; G06F 15/00
[52] U.S. Cl. .......................... 345/115; 345/133; 345/154; 395/131; 395/134
[58] Field of Search ..................... 345/118, 119, 345/120, 121, 127, 150, 153, 154, 155, 133, 203, 115; 395/129, 131, 133, 134, 139, 153, 154, 155, 157, 161, 162, 164, 143; 348/557, 577, 578, 708, 586

[56] References Cited

U.S. PATENT DOCUMENTS

| | | | |
|---|---|---|---|
| 4,574,364 | 3/1986 | Tabata et al. | 345/119 |
| 4,710,767 | 12/1987 | Sciacero et al. | 345/119 |
| 4,823,120 | 4/1989 | Thompson et al. | 345/150 |
| 4,947,342 | 8/1990 | Katsura et al. | |
| 5,072,411 | 12/1991 | Yamaki | 395/162 |
| 5,103,407 | 4/1992 | Gabor . | |
| 5,159,665 | 10/1992 | Priem et al. | 395/143 |
| 5,193,148 | 3/1993 | Alcorn et al. | |
| 5,216,413 | 6/1993 | Seiler et al. | |
| 5,224,210 | 6/1993 | Pinedo et al. | 395/164 |
| 5,227,771 | 7/1993 | Kerr et al. | 345/127 |
| 5,230,041 | 7/1993 | Dinwiddie, Jr. et al. | 395/154 |
| 5,233,684 | 8/1993 | Ulichney | 345/154 |
| 5,245,702 | 9/1993 | McIntyre et al. | 345/119 |
| 5,251,298 | 10/1993 | Nally | 345/203 |
| 5,258,750 | 11/1993 | Malcolm, Jr. et al. | 345/115 |
| 5,258,826 | 11/1993 | Wakeland et al. | 348/708 |
| 5,381,184 | 1/1995 | Gehrmann | 348/586 |
| 5,404,445 | 4/1995 | Matsumoto | 395/162 |

OTHER PUBLICATIONS

Foley, van Dam, Feiner, and Hughes, *Computer Graphics Principles and Practice,* 2nd edition, Addison Wesley, 1990 (ISBN 0-201-12110-7), pp. 855-922 (Chapter 18).

Luther, *Digital Video in the PC Environment,* 2nd edition, McGraw-Hill Book Company, 1991 (ISBN 0-07-039176-9), pp. 89-102 and 207-223 (Chapters 6 and 12).

80386 *System Software Writer's Guide,* Intel Corp. 1987, Intel Order No. 231499.

386™ *DX Microprocessor Programmer's Reference Manual,* Intel Corp. 1990, Intel Order No. 230985.

Microsoft® *Video for Windows Development Kit—Programmer's Guide,* Microsoft Corp. 1992–93, Document No. AT52675-1193.

"Encoding Parameters of Digital Television for Studios," CCIR Recommendation 601, XVth Plenary Assembly, Geneva 1982, (pp. 95–104).

*Primary Examiner*—Steven Saras
*Attorney, Agent, or Firm*—Steve Mendelsohn; William H. Murray

[57] ABSTRACT

A method and apparatus for displaying an image in a system having an image generation subsystem and an image display subsystem. The image generation subsystem provides digital data corresponding to the image and interrogates the image display subsystem to determine image display subsystem capabilities for at least one of (1) color format support, (2) access to an image display subsystem memory, and (3) window management. The image generation subsystem and the image display subsystem then process the digital data in accordance with the results of the interrogation. The image display subsystem then displays the processed digital data.

58 Claims, 10 Drawing Sheets

METHOD AND APPARATUS FOR DISPLAYING AN IMAGE USING SUBSYSTEM INTERROGATION

BACKGROUND OF THE INVENTION

1. Field of the Invention

The present invention relates to image processing, and, in particular, to methods and apparatuses for displaying images on a computer system operating in a windowed environment.

2. Description of the Related Art

It is desirable to display images on a computer system operating in a windowed environment such as the Microsoft® Video for Windows (VfW) environment running under a Microsoft® Windows 3.X system. It is particularly desirable to display high-quality motion video on the graphics monitor of a conventional VfW-based personal computer (PC) system while minimizing the need for special-purpose hardware.

Raw digitized motion video consumes a lot of storage space. For example, a 15-frame-per-second (FPS) video sequence, at a frame size of 320 pixels by 240 pixels and with 24-bit color, consumes about 3.5 MBytes per second. As a result, for conventional PC systems, digital video is stored in a compressed format.

The amount of compression required is driven by bandwidth limitations of the storage devices used in PC systems. The only practical mass storage for motion video is CD-ROM. Access rates from single-spin CD-ROM devices is about 150 KBytes/sec. To play digital video back from CD-ROM devices, motion video is typically compressed to accommodate this access rate limitation. This compression of video data is typically performed on video data in a YUV format since compression ratios for YUV video data are typically greater than compression ratios for video data in other formats such as an RGB format.

Decompressing and displaying video is a computation intensive task. Conventional window-based PC video systems are capable of processing motion video data to combine video images with graphics for display on a display monitor. Like any system, conventional video systems have limits to their performance capabilities. It is desirable to provide an improved window-based video system that has greater performance capabilities than those of conventional video systems.

Referring now to FIG. 1, there is shown a software block diagram of a conventional video system 100 for displaying video images under the Microsoft® Video for Windows environment. In FIG. 1:

Application 102 is an application program running in the VfW environment,

Graphic-display interface (GDI) 104 is part of Microsoft® Windows,

Media control interface (MCIAVI) 108 is part of Microsoft® Video for Windows,

Image generation subsystem (IGS) 110 is the software driver for the subsystem of video system 100 responsible for processing video image data to transform it from the format as received by the video system (e.g., compressed YUV format) to a format acceptable for the image display subsystem software 106, and Image display subsystem (IDS) 106 is the software driver for the subsystem of video system 100 that handles the display of the video data processed by the IGS.

Application 102, GDI 104, MCIAVI 108, IGS 110, and IDS 106 may all reside in system memory (not shown) and be implemented by a central processing unit (CPU) (not shown). Video system 100 also includes a mass storage device (not shown) for storing compressed YUV data, IDS memory for storing display bitmap (i.e., frame buffer) data, and a display monitor (not shown) for displaying decompressed video images.

In conventional video system 100, after application 102 tells Video for Windows to open a particular video window, MCIAVI defines the window in the display raster of the display monitor. MCIAVI 108 then accesses compressed YUV video data from the mass storage device and stores the compressed YUV video data to system memory. MCIAVI 108 then instructs IGS 110 to process the data for display. IGS 110 accesses the compressed YUV video data from system memory, decompresses the compressed YUV video data, and stores the decompressed YUV video data back to system memory.

Microsoft® Windows accepts video data in only RGB_8 or RGB_24 format. Microsoft® Video for Windows extends this capability by accepting video data in RGB_16 format. In conventional video system 100, therefore, IGS 110 accesses the decompressed YUV video data from system memory, converts the decompressed YUV video data to an RGB format that Windows supports, and stores the RGB video data back to system memory. IGS 110 then passes the RGB video data to MCIAVI 108, which passes the RGB-format video data to GDI 104 and IDS 106 for storage to IDS memory and eventual display on the display monitor.

In conventional video system 100, IGS 110 spends most of its time decompressing compressed YUV video data, converting decompressed YUV video data to the desired RGB display format, and copying the converted RGB video data to MCIAVI 108. In addition, MCIAVI 108 and GDI 104 spend time copying the image data to IDS 106. Video system performance can be improved by accelerating the rate at which video system 100 can process video data.

Conventional video systems like video system 100 work well when the overhead required to display data is small compared with the overhead required to generate it. This is usually the case with computer graphics, where the same image components are used repeatedly. But in motion video, images can change as many as 30 times a second. The overhead associated with such image updates becomes significant, and the display architecture that was satisfactory for computer graphics becomes a motion-video bottleneck.

It is therefore desirable to accelerate video processing and thereby improve video system performance by reducing the amount of time spent by the image generation subsystem in copying converted video data to the display.

In addition, at the frame rates associated with motion video, format conversion overhead becomes significant. It is therefore desirable to accelerate video processing and thereby improve video system performance by reducing the amount of time spent by the image generation subsystem in converting decompressed video data for display.

It is accordingly an object of this invention to overcome the disadvantages and drawbacks of the known art and to provide a window-based video system with accelerated video processing and improved performance compared with conventional window-based video systems.

It is a further object of the present invention to improve video system performance by reducing the amount of time spent by the image generation subsystem in converting decompressed video data for display.

It is a further object of the present invention to improve video system performance by reducing the amount of time spent by the image generation subsystem in copying converted video data to the display.

Further objects and advantages of this invention will become apparent from the detailed description of a preferred embodiment which follows.

SUMMARY OF THE INVENTION

According to a preferred embodiment, the present invention is a method and apparatus for displaying an image in a system having image generation and display subsystems. The image generation subsystem provides digital data corresponding to the image and interrogates the image display subsystem to determine image display subsystem capabilities for at least one of (1) color format support, (2) access to an image display subsystem memory, and (3) window management. The image generation and display subsystems then process the digital data in accordance with the results of the interrogation. The image display subsystem then displays the processed digital data.

According to an alternative preferred embodiment, the present invention is a system for displaying an image having an image generation subsystem, an image display subsystem, and a digital media architecture interface. A first part of the interface resides in the image generation subsystem and a second part of the interface resides in the image display subsystem. The image generation subsystem uses the interface to interrogate the image display subsystem to determine its capabilities for at least one of (1) color format support, (2) access to an image display subsystem memory, and (3) window management. The image generation subsystem then processes the digital data in accordance with the results of the interrogation and the image display subsystem displays the processed digital data.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

A. Video System Hardware Configuration

Figure 2:
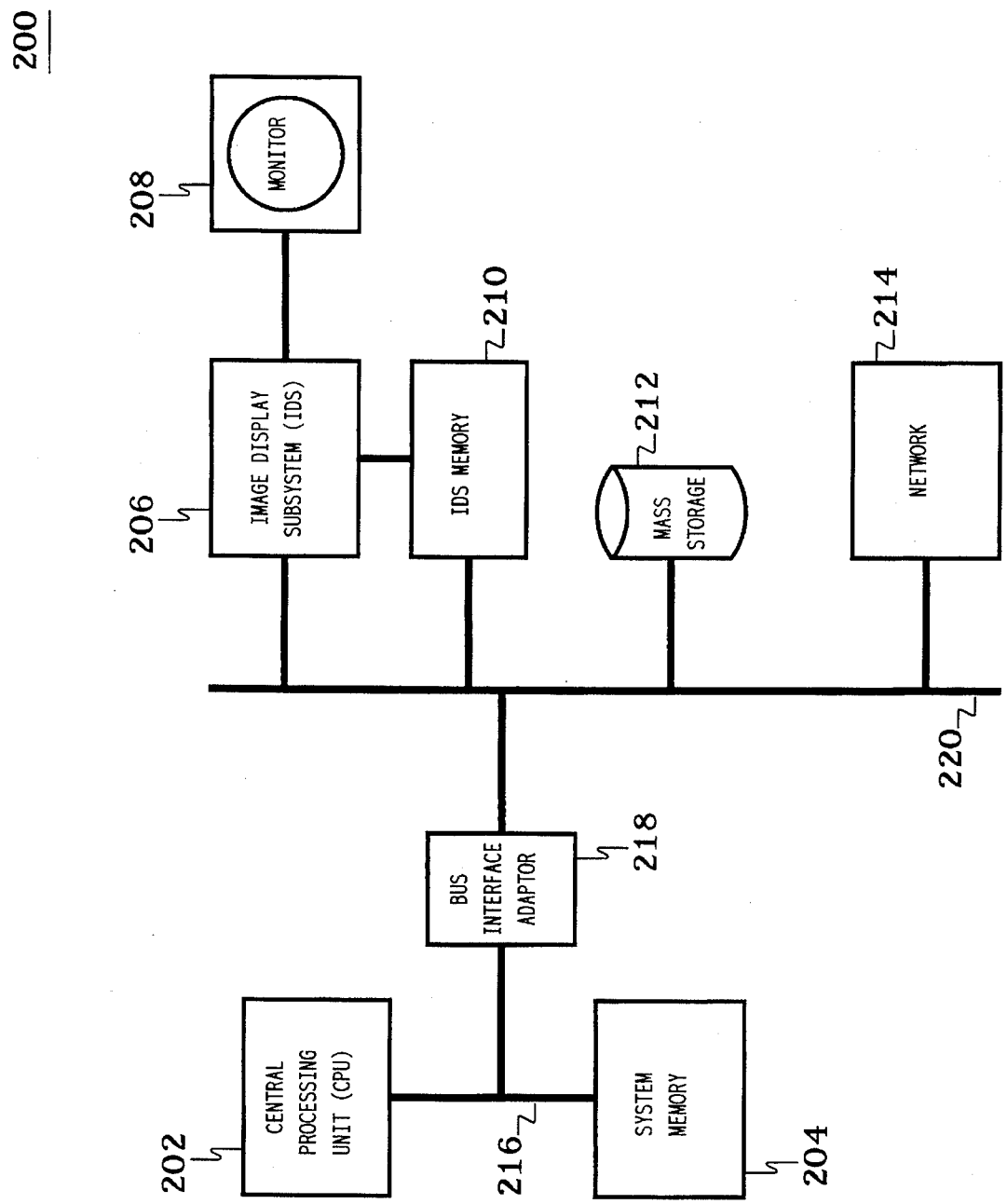
FIG. 2 is a hardware block diagram of a video system for displaying video in the Microsoft® Video for Windows (VfW) environment, according to a preferred embodiment of the present invention.

Referring now to FIG. 2, there is shown a hardware block diagram of video system 200 for displaying video under Microsoft® Video for Windows (VfW) in the Microsoft® Windows 3.X environment, according to a preferred embodiment of the present invention. In video system 200, compressed video data (e.g., in a compressed YUV format) is either accessed from mass storage device 212 or received from network 214, and stored to system memory 204. Central processing unit (CPU) 202 retrieves the compressed YUV video data from system memory 204, decompresses the compressed YUV video data, and stores the resulting decompressed YUV video data back to system memory 204. For purposes of this specification, the term "video" means digital video.

Depending upon the capabilities of the software implemented in video system 200, in one mode of operation, CPU 202 retrieves the decompressed YUV video data from system memory 204, converts the decompressed YUV video data to a display format (e.g., an RGB format), stores the converted RGB video data back to system memory 204, and then makes the converted RGB video data available for transfer to image display subsystem (IDS) memory 210. Image display subsystem 206 then accesses the converted RGB video data from IDS memory 210 for processing (e.g., digital to analog conversion) and display on display monitor 208. In this mode of operation, video system 200 functions similarly to conventional video system 100 of FIG. 1.

In another mode of operation, any necessary conversion of the decompressed YUV video data is implemented by image display subsystem 206. In this mode, CPU 202 either transmits the decompressed YUV video data directly to IDS memory 210 or makes the decompressed YUV video data available to IDS 206. In the latter case, IDS 206 copies the decompressed YUV video data from system memory 204 to IDS memory 210. In either case, once the decompressed YUV video data is stored in IDS memory 210, IDS 206 performs any necessary conversion of the decompressed YUV video data for display on display monitor 208. In this mode of operation, the responsibility for format conversion is off-loaded from CPU 202 to IDS 206.

CPU 202 may be any suitable general purpose processor and is preferably an Intel® x86 processor, where an Intel® x86 processor is either an Intel® 386, 486, or Pentium processor. Those skilled in the art will understand that higher powered processors are preferred to provide greater system performance.

System memory 204 may be any suitable memory devices such as dynamic random access memory (DRAM) or static random access memory (SRAM) devices, and is preferably a DRAM device. IDS memory 210 may be any suitable memory devices such as DRAM, SRAM, or video random access memory (VRAM) devices, and is preferably a VRAM device. Mass storage device 212 may be any suitable storage device for compressed video data such as a hard drive, CD-ROM, or floppy disk. Network 214 may be a local-area or wide-area network suitable for teleconferencing, cable television, telephony, or other similar application in which compressed video data is received from a remote source. Display monitor 208 may be any suitable device for displaying video images and is preferably a conventional PC graphics monitor.

Processor local bus 216 is preferably the high-speed data bus for CPU 202. Expansion bus 220 may be any suitable digital data bus and is preferably a Peripheral Component Interconnect (PCI) bus. Expansion bus 220 may also be an Industry Standard Architecture (ISA) or Extended ISA (EISA) bus. Bus interface adaptor 218 may be any interface suitable for connecting expansion bus 220 and processor local bus 216 such that buses 216 and 220 are allowed to operate at different speeds.

Image display subsystem 206 may be any suitable subsystem for displaying decompressed video data on a display monitor. In a preferred embodiment, IDS 206 is any image display subsystem that supports an enhanced interface between IDS 206 and the image generation subsystem of video system 200. Those skilled in the art will understand that IDS 206 may be implemented entirely in software, entirely in hardware, or a combination of both hardware and software. It will also be understood that some or all of the IDS software may be implemented on CPU 202. The purpose of the present invention is to provide video system hardware and software components that may be configured with any of a variety of suitable manifestations of image generation subsystems.

Preferred embodiments of the enhanced interface and the image generation subsystem are described in the following sections of this specification.

B. Video System Software Configuration

Figure 3:
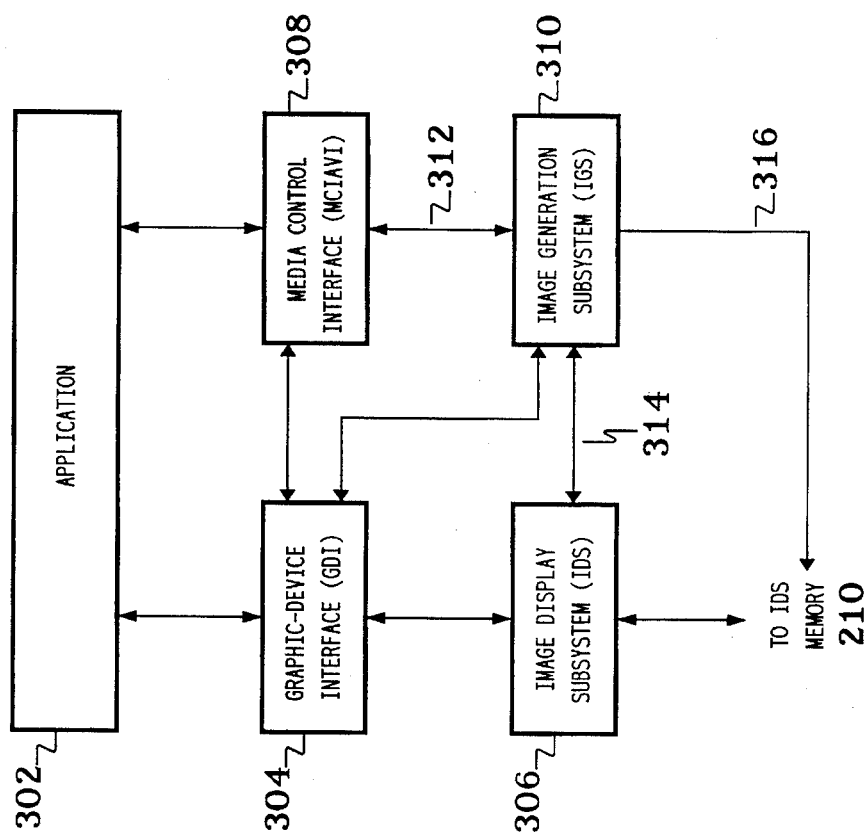
FIG. 3 is a software block diagram of the video system of FIG. 2.

Referring now to FIG. 3, there is shown a software block diagram of video system 200 of FIG. 2, according to a preferred embodiment of the present invention. Like conventional video system 100 of FIG. 1, video system 200 has an application program 302 that runs under the Microsoft® Video for Windows (VfW) environment (MCIAVI 308) in the Microsoft® Windows system (GDI 304). Video system 200 also has image generation subsystem (IGS) 310, image display subsystem (IDS) 306, and an enhanced interface between IGS 310 and IDS 306 (represented in FIG. 3 by interface path 312, 314, and 316). IDS 306 of FIG. 3 represents the software of IDS 206 of FIG. 2.

The enhanced interface of video system 200 is an integrated digital media architecture interface that provides the capability for accelerating video processing on video system 200 by (1) reducing the color format conversion responsibilities of IGS 310 and/or (2) reducing the volume and distance (i.e., number of layers) of data transfer from IGS 310 to IDS 306. Both of these improvements are made possible by the ability of the enhanced interface to support the transfer of video data from IGS 310 to IDS 306 without going through Windows GDI 304.

The enhanced interface takes advantage of the fact that IDS 306 may support more color formats than the two or three RGB formats supported by Microsoft® Video for Windows. If IDS 306 is capable of receiving video data in the same color format as the decompressed video data (e.g., YUV9), then IGS 310 may not need to convert the decompressed YUV9 video data to a different color format. Depending on the particular capabilities of IDS 306, IDS 306 may then perform color conversion on the video data received from IGS 310.

The enhanced interface reduces the distance of data transfer by avoiding GDI access (i.e., the transfer of video data from IGS 310 to MCIAVI 308 to GDI 304 to IDS 306 to IDS memory 210 of FIG. 2). The enhanced interface provides this distance reduction when IDS 306 supports either direct access or indirect non-GDI access to IDS memory 210 by IGS 310.

When IDS 306 supports direct access by IGS 310 to IDS memory 210, the enhanced interface reduces the volume of data transfer by taking advantage of the temporal redundancy typically found in video imagery. Since video imagery typically demonstrates a high degree of temporal redundancy (i.e., many corresponding pixels in consecutive video frames do not change significantly), direct access permits IGS 310 to update only those pixels components in IDS memory 210 that require update (i.e., only a subset of the pixels corresponding to the entire image). As a result, the volume of data transfer can be greatly reduced.

These improvements reduce the percentage of CPU time IGS 310 spends for conversion and data transfer, leaving more time available for decompression. As a result, video system 200 may process video data at greater frame rates than would otherwise be available, thereby providing performance of video system 200 greater than that of conventional video systems such as video system 100.

In a preferred embodiment, the enhanced interface establishes a protocol by which IGS 310 interrogates IDS 306 about the video processing capabilities supported by IDS 306. Based on the results of those interrogations, IGS 310 determines how to process and transfer video data to IDS 306 for the current video window. The enhanced interface removes the need for IDS-specific coding in IGS 310. The result is an image generation subsystem that is compatible with more than one specific type of image display subsystem. Moreover, changes and improvements to the image display subsystem will not necessarily require changes to the image generation subsystem.

The protocol for the enhanced interface is defined by a set of enhanced interface functions that are called by IGS 310 and are recognized and properly handled by IDS 306. The syntax for these functions is defined in further detail later in this specification in Section D.

Referring again to FIG. 3, the enhanced interface of video system 200 supports three different modes of access by IGS 310 to IDS memory 210 of FIG. 2 (i.e., ways of getting video data from IGS 310 to IDS memory 210). GDI access (shown along path 312) is the same path used by conventional video system 100 of FIG. 1. In addition, the enhanced interface also supports direct access (shown along path 316) and indirect non-GDI access (shown along path 314). IGS 310 always has the GDI access mode available. In addition, IGS 310 may have one of either the direct access mode or the indirect non-GDI access mode available or neither. When and how these various access modes are used are described in further detail later in this specification in conjunction with FIGS. 9 and 10.

Figure 1:
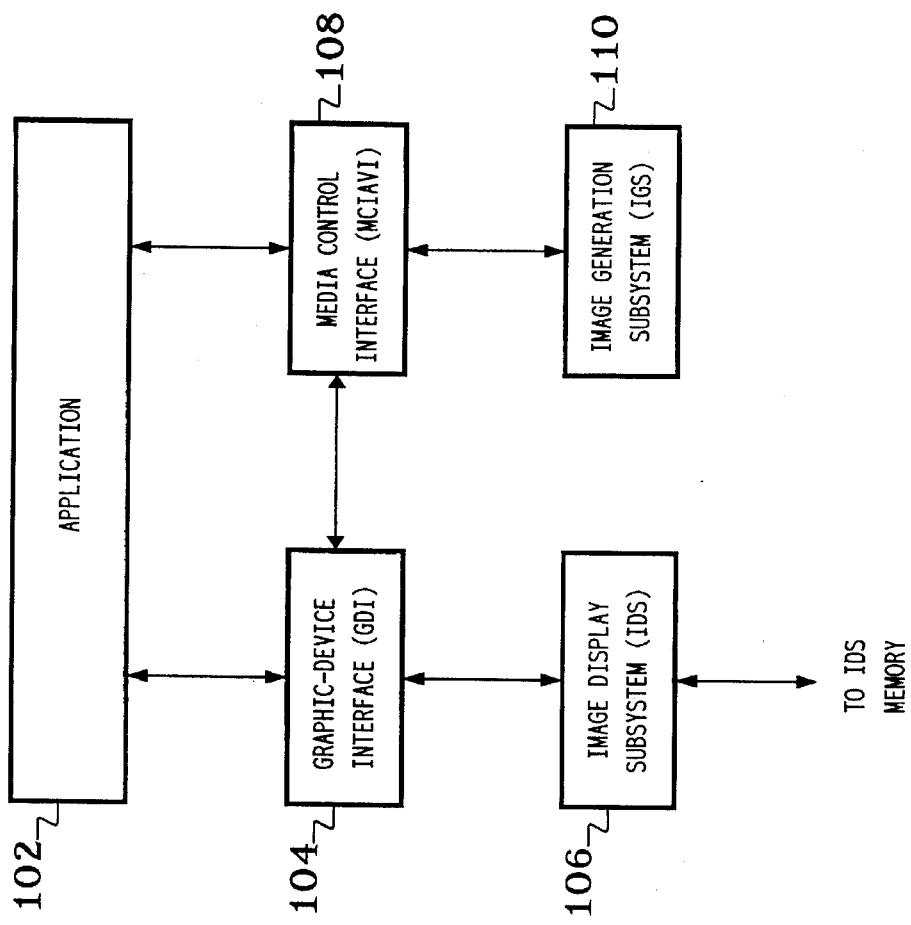
FIG. 1 is a software block diagram of a conventional video system for displaying video images under the Microsoft® Video for Windows environment.

The enhanced interface is designed to be an extension of the interface between GDI 104 and IDS 106 of conventional video system 100 of FIG. 1. IGS 310 may be implemented entirely in software, entirely in hardware, or a combination of both hardware and software. It will also be understood that some or all of the IGS software may be implemented on CPU 202 of FIG. 2. In alternative preferred embodiments of the present invention, some or all of the IGS functions may be implemented using a special purpose processor, such as an Intel® 82750PB pixel processor.

C. Video System Processing

1. Top-Level Video System Processing

Figure 4:
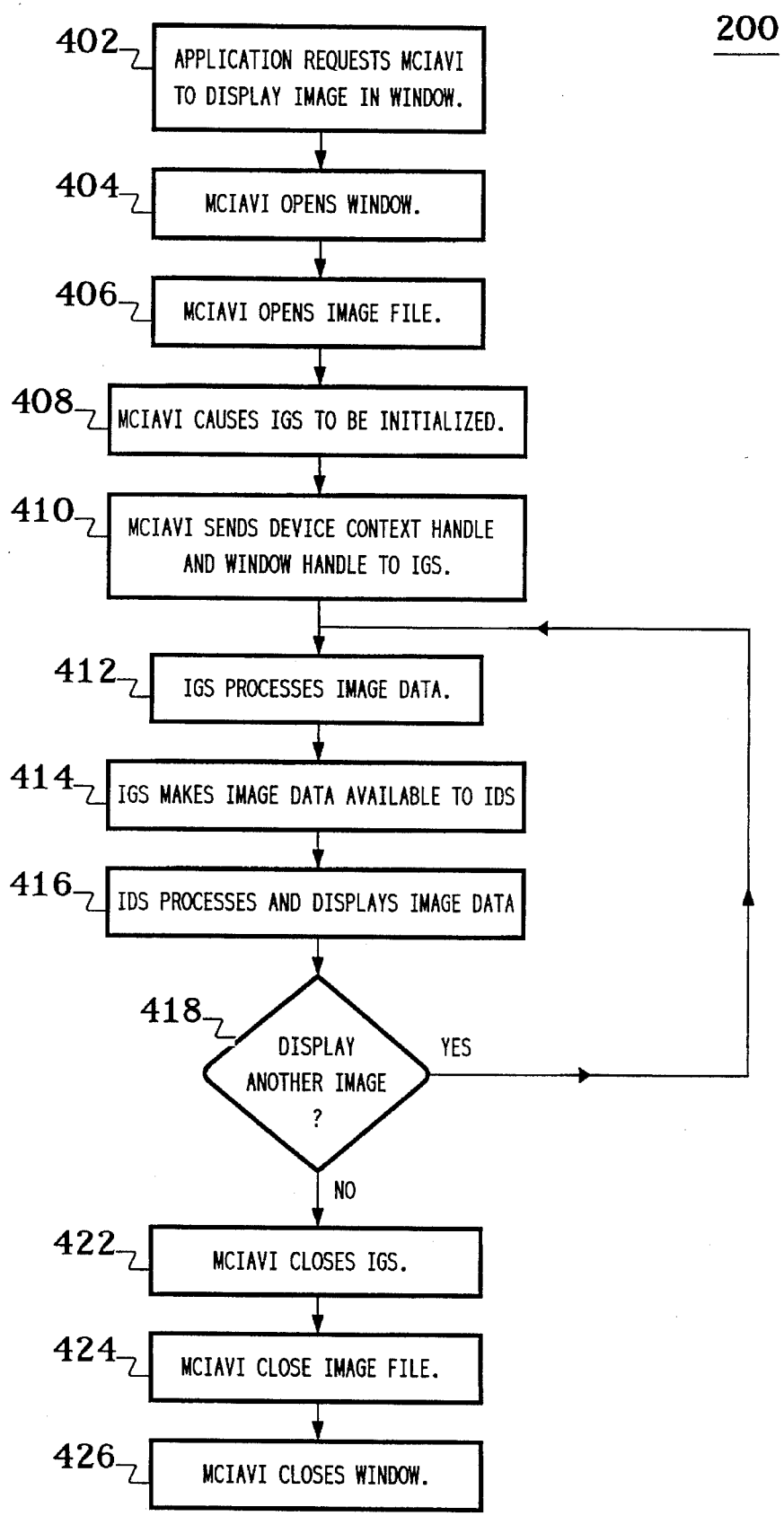
FIG. 4 is a process flow diagram of the top-level processing of the video system of FIGS. 2 and 3.

Referring now to FIG. 4, there is shown a process flow diagram of the top-level processing of video system 200 of FIGS. 2 and 3, according to a preferred embodiment of the present invention. After application 302 requests Video for Windows to display one or more images in a window (block 402 of FIG. 4), MCIAVI 308 opens the window (block 404), opens the appropriate image file (block 406), causes image generation subsystem 310 (block 408) to be initialized, and sends the device context handle and window handle to IGS 310 (block 410). Those skilled in the art will understand that the device context and window handles provide mechanisms for IGS 310 to determine the characteristics of the video data and display window, respectively. These characteristics include the size and position of the display window within the display raster of display monitor 208.

IGS 310 processes the image data (block 412) and makes the processed image data available to image display subsystem 306 (by one of the three possible display access modes) (block As described later in this specification in conjunction with FIG. 7, the processing of IGS 310 includes decompression and if necessary color format conversion. IDS 306 then further processes and displays the image data (block 416). The processing of IDS 306 includes color format conversion (if necessary) and digital-to-analog conversion. Those skilled in the art will understand that some preferred embodiments of IDS 206 of FIG. 2 are capable of converting YUV video data directly to analog signals through hardware.

If another image is to be displayed (block 418), then processing returns to process and display the next image (blocks 412-416). Otherwise, there is no other image to display (block 418) and MCIAVI 308 closes IGS 310 (block 422), closes the image file (block 424), and closes the window (block 426), thereby ending processing for that video window request by application 302.

Those skilled in the art will understand that video system 200 is not limited to the sequence of steps presented in FIG. 4. For example, the sequences of opening and closing the window, the image file, and IGS 310 may vary. In addition, application 302 may open and close the window rather than having MCIAVI 308 open and close the window (blocks 404 and 426 of FIG. 4).

2. Initialization of Image Generation Subsystem

Figure 5:
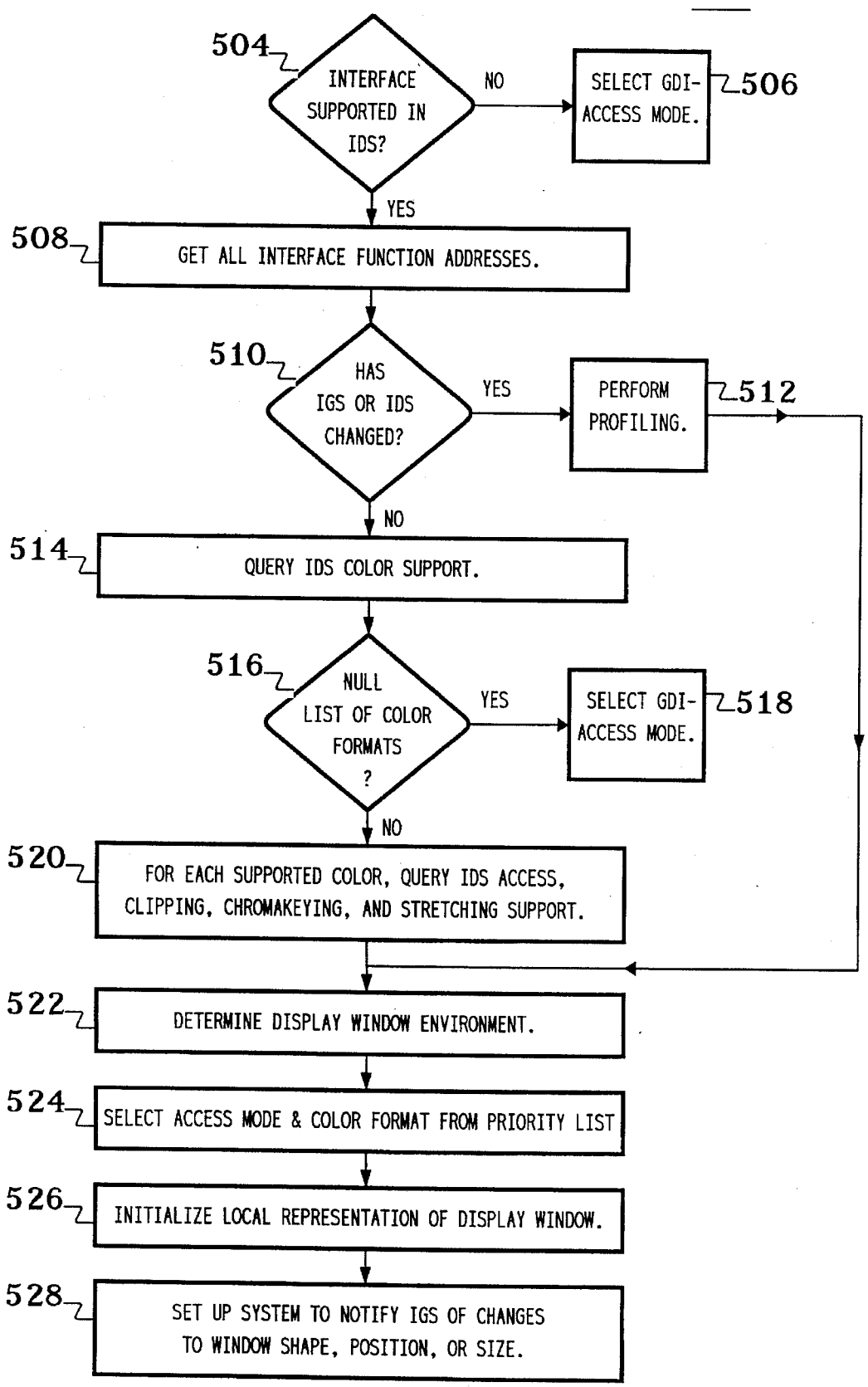
FIG. 5 is a process flow diagram of the initialization of the image generation subsystem of the video system of FIGS. 2 and 3.

Referring now to FIG. 5, there is shown a process flow diagram of the initialization of image generation subsystem 310 (block 408 of FIG. 4), according to a preferred embodiment of the present invention. IGS initialization preferably occurs only when the window is first opened or when the size of the window changes sufficiently to warrant reinitialization (as determined by IGS 310). Window size changes are described in further detail later in this specification in Section C.4.

The enhanced interface of the present invention is preferably implemented in software, part of which resides in the image generation subsystem and part of which resides in the image display subsystem of video system 200. Since IGS 310 is compatible with all image display subsystems (i.e., even those that do not support the enhanced interface), IGS 310 determines whether the enhanced interface is supported by IDS 306 (block 504 of FIG. 5). IGS 310 preferably makes this determination by asking the Windows system for the library address of one of the enhanced interface functions using the Microsoft® GetProcAddress function.

If the Windows system replies that that function does not exist in the Windows function library, then IGS 310 knows that IDS 306 does not support the enhanced interface. In that case, IGS 310 falls back to the default GDI access mode of transferring RGB video data to IDS 306 via GDI 304 (as in conventional video system of FIG. 1) (block 506 of FIG. 5).

If the Windows system replies with a valid function address, then IGS 310 knows that IDS 306 does support the enhanced interface and IGS 310 then asks the Windows system for the addresses of the rest of the enhanced interface functions (block 508).

The enhanced interface provides IGS 310 with the ability to optimize system performance for the particular capabilities supported by IDS 306 for the current video window by selecting the best (e.g., fastest) mode of operation from among the variety of permutations of capabilities supported by IDS 306. IGS 310 does this by profiling the system performance for each of the possible permutations of capabilities supported by IDS 306 and then using the results of that profiling to generation priority lists that tell IGS 310 which permutation to select for a particular video window. Profiling only needs to be performed once for a particular configuration of IGS 310 and IDS 306.

Thus, if IGS 310 determines that the state of either IGS 310 or IDS 306 has changed (block 510 of FIG. 5), then IGS 310 re-profiles system performance (block 512) and processing then continues to block 522 (described below). For example, the state of IGS 310 will change if the speed of CPU 202 changes (e.g., if CPU 202 is upgraded to a faster processor). Similarly, the state of IDS 306 will change if IDS 306 is replaced with an improved image display subsystem. Profiling is described in further detail later in this specification in conjunction with FIG. 6.

If the states of IGS 310 and IDS 306 have not changed (block 510), then IGS 310 interrogates IDS 306 to determine what color formats are supported by IDS 306 (block 514). IGS 310 performs this interrogation by calling the enhanced interface function QueryColorSupport with the appropriate parameters. IDS 306 responds to QueryColorSupport by returning to IGS 310 a pointer to a list of values corresponding to the color formats supported by IDS 306. QueryColorSupport and all the other enhanced interface functions are described in further detail later in this specification in Section D.

If IDS 306 does not support any of the color formats recognized by IGS 310 (block 516), then IGS 310 defaults to the GDI access mode (block 518). Otherwise, IDS 306 supports one or more of the color formats recognized by IGS 310. If that case, for each color format supported by IDS 306, IGS 310 interrogates IDS 306 to determine the capabilities supported by IDS 306 for display access, clipping, chromakeying, and stretching (block via QueryDisplayAccessSupport, QueryClippingSupport, QueryChromaKeySupport, QueryStretchSupport functions, respectively).

IDS 306 may support one of three different combinations of display access (i.e., modes of transferring video data from IGS 310 to IDS 306): (1) GDI access mode only, (2) either GDI access mode or direct access mode, and (3) either GDI access mode or indirect non-GDI access mode. The direct access and indirect non-GDI access modes are described in further detail later in this specification in conjunction with FIGS. 9 and 10. The GDI access mode is the conventional access mode employed by conventional video systems such as video system 100.

IDS 306 either does not support clipping or supports one of two types of clipping. In one type of clipping support, IDS 306 needs to be supplied with a clip list. In the other type of clipping support, IDS 306 does not need to be supplied with a clip list.

IDS 306 either does not support chromakeying or supports chromakeying in a particular color format. If IDS 306 supports chromakeying, the chromakey color format will be one of the color formats listed by IDS 306 in response to the QueryColorSupport function. Those skilled in the art will understand that, in a preferred embodiment, IDS 306 may support either binary chromakeying or fractional alpha blending or both.

IDS 306 either does not support stretching or supports one of two types of stretching. In one type of stretching support, IDS 306 performs stretching in the X axis only (i.e., along image rows). In the other type of stretching support, IDS 306 performs stretching in both the X and Y axes (i.e., along image rows and columns). IDS 306 may support stretching in only integer multiples or in arbitrary multiples. In addition, IDS 306 may support only positive stretching (i.e., enlarging) or negative stretching (i.e., shrinking). When IGS 310 interrogates IDS 306 about stretch capabilities, the size of the stretched window is passed to IDS 306 so that IDS 306 can determine if it supports that particular instance of stretching. (Note that the size of the source image would already have been passed to IDS 306 in an earlier call to enhanced interface function OpenVideoChannel.)

After determining the full range of IDS 306 support capabilities, IGS 310 uses Windows GDI functions to determine the characteristics of the particular display window environment (i.e., whether stretching is required and whether overlapping is required) (block 522). Based on those characteristics, IGS 310 selects an access mode from the IDS-supported access modes and a color format from the IDS-supported color formats to use for the current video window (block 524).

IGS 310 then initializes the local representation of the shape of the display window to a rectangular display window (block 526). In addition, IGS 310 sets up video system 200 to notify IGS 304 of changes to the shape, position, and/or size of the display window (block 528). For purposes of this specification, there is a distinction between the concepts of window shape and window size, as defined in the following paragraphs.

For purposes of this specification, the shape of a display window is defined by the subset of pixels of the entire video image to be displayed. The display window changes shape whenever the contents of that display subset changes. Those skilled in the art will understand that display windows change shape when window overlapping changes or when a window extends past an edge of the display raster. For example, if a graphics window is brought up to cover a region of the video display window, then the shape of the display window is said to change. The display window shape changes again, for example, when that graphics window is closed.

The position of the display window is defined by the relationship between a corner pixel (e.g., upper left corner) of the video image and the corresponding corner of the frame buffer which represents the display raster of display monitor 208.

The size of the display window corresponds to the height and width of the display window in numbers of pixels. In a preferred embodiment, window size changes correspond to enlargements or reductions in the size of the video image. That is, when the display window size increases, the video image is positively stretched to fill the bigger window. Similarly, when the display window size decreases, the video image is negatively stretched (i.e., shrunk) to fill the smaller window.

In a preferred embodiment, IGS 310 sets up GDI 304 so that IGS 310 is called whenever the display window changes either shape, position, or size. In this embodiment, IGS 310 gives GDI 304 the Windows addresses of special IGS functions. When the display window changes, GDI 304 calls the appropriate IGS function to get IGS 310 to handle that type of change.

In an alternative preferred embodiment, IGS 310 sets up MCIAVI 308 so that MCIAVI 308 sends IGS 310 a special message whenever the display window changes shape, position, or size. In response to the MCIAVI message, IGS 310 calls its own special function to handle the appropriate window change.

3. IGS Profiling of Video System Performance

Figure 6:
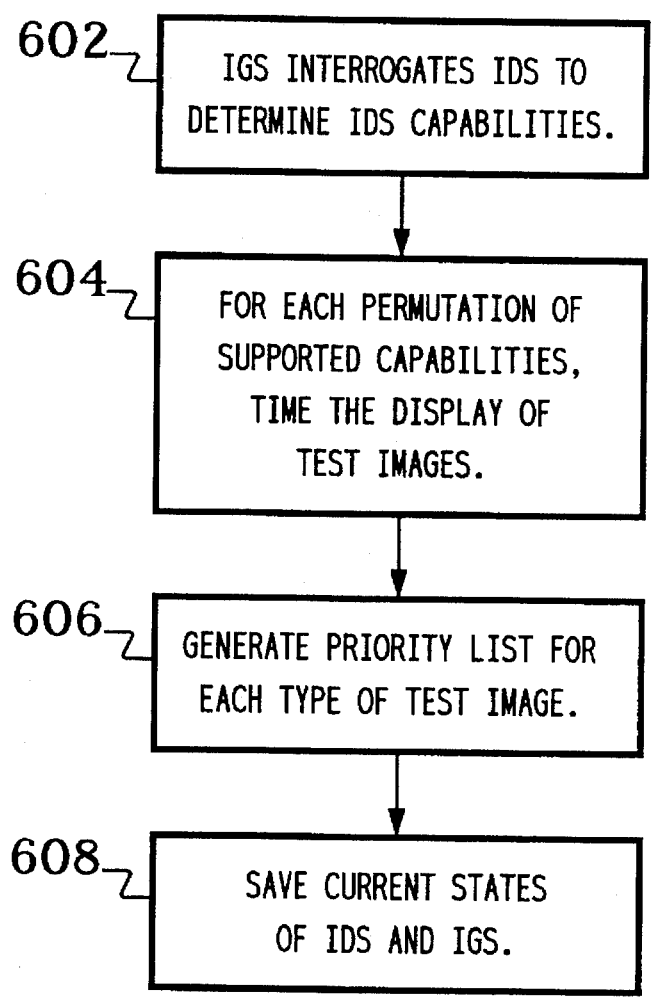
FIG. 6 is a process flow diagram of the processing implemented by the image generation subsystem to profile the video system of FIGS. 2 and 3.

Referring now to FIG. 6, there is shown a process flow diagram of the processing implemented by IGS 310 to profile the performance of video system 200 (block 512 of FIG. 5), according to a preferred embodiment of the present invention. The purpose of profiling is to characterize (in a pseudo-off-line fashion) the performance of video system 200 for each of the possible permutations of capabilities supported by image display subsystem 306 so that image generation subsystem 310 can determine (in real time) which permutation to select to optimize system performance for the current video window. In a preferred embodiment, profiling only needs to be performed once for a given configuration of image generation subsystem 310 and image display subsystem 306.

To perform profiling, IGS 310 interrogates IDS 306 to determine the capabilities of the image display subsystem (block 602). This interrogation is preferably identical to that performed in blocks 514 through 520 of FIG. 5, whereby IGS 310 determines IDS color support (via QueryColorSupport) and then, if appropriate, determines IDS display access, clipping, chromakeying, and stretching support (via QueryDisplayAccessSupport, QueryClippingSupport, QueryChromaKeySupport, and QueryStretchSupport, respectively) for each color format supported by IDS 306.

For each permutation of IDS capabilities, IGS 310 processes and causes to be displayed at least one test image that represents that permutation (block 604). IGS 310 causes video system 200 to display four different types of test images to demonstrate all permutations of color format and display access mode supported by IDS 306. The four types of test images are: (1) images with stretching and overlapping; (2) images with stretching but no overlapping; (3) images with overlapping but no stretching; and (4) images with neither stretching nor overlapping. IGS 310 measures the processing time for each test image for each permutation (block 604).

Using the timing results, IGS 310 then generates and stores a priority list for each type of test image (block 606). Each priority list tabulates the most desirable permutation of IDS capabilities for one of the four types of test images. This priority list is then used by IGS 310 to select in real time the color format and display access mode for a particular video window (block 524 of FIG. 5) in order to optimize the performance of video system 200 for that video window. For example, if the current video window requires clipping and stretching, then IGS 310 refers to the priority list corresponding to those test images that had clipping and stretching to select the optimal display access mode and color format for the current video window.

IGS 310 also stores the current states of the image generation subsystem and the image display subsystem (block 608) for use as a reference when IGS 310 tests for changes in IGS or IGS configuration (block 510 of FIG. 5).

4. IGS Processing of Video Data—Window Management

Figure 7:
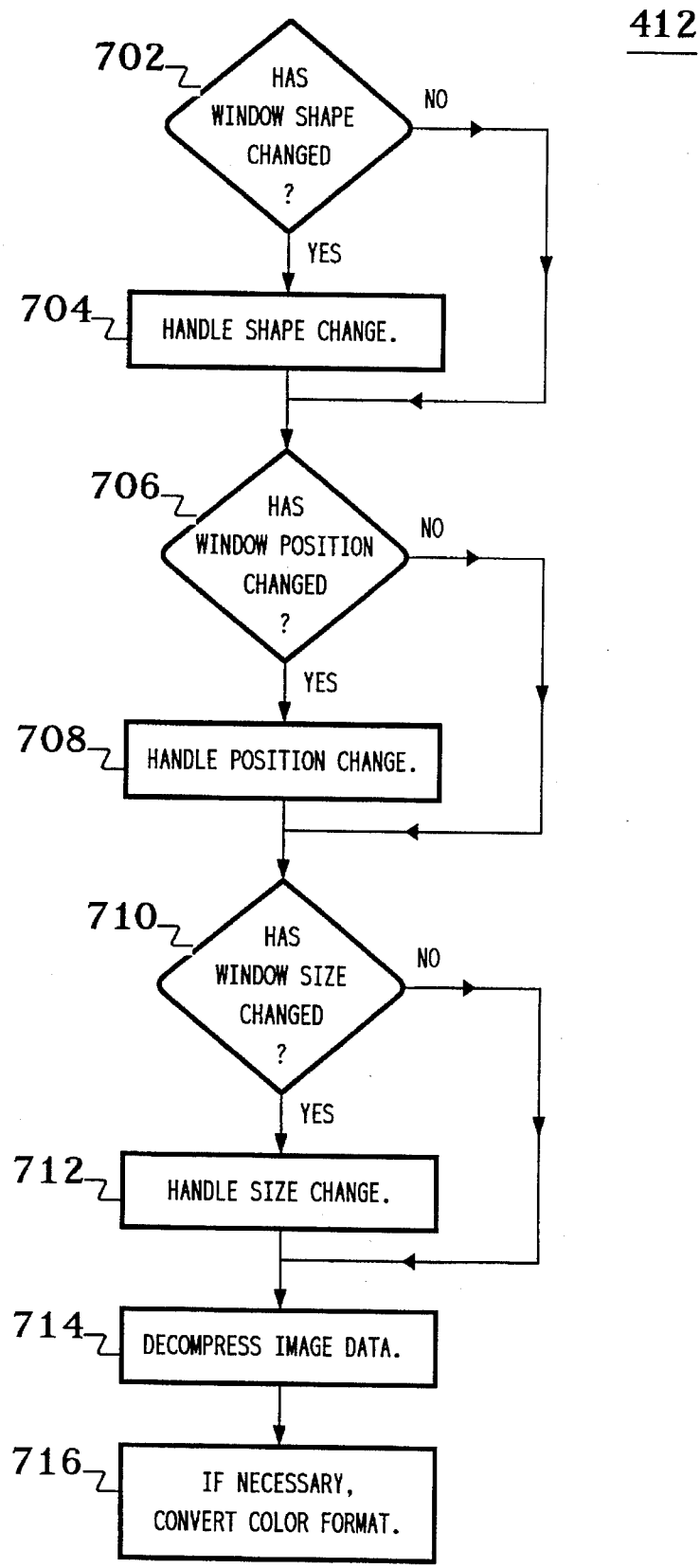
FIG. 7 is a process flow diagram of the video data processing implemented by the image generation subsystem of the video system of FIGS. 2 and 3.

Referring now to FIG. 7, there is shown a process flow diagram of the video data processing implemented by image generation subsystem 310 (block 412 of FIG. 4), according to a preferred embodiment of the present invention.

When the window shape changes (block 702), IGS 310 handles the window shape change (block 704). IGS 310 is informed of window shape changes by either GDI 304 or MCIAVI 308 depending upon the preferred embodiment implemented (as described earlier in this specification in conjunction with block 528 of FIG. 5). IGS 310 then determines the updated window shape from the device context and window handles provided by GDI 304 (block 410 of FIG. 4).

When the window position changes (block 706), IGS 310 handles the window position change (block 708). As with window shape changes, IGS 310 is informed of window shape changes by either GDI 304 or MCIAVI 308 depending upon the embodiment. IGS 310 then determines the updated window position from the device context and window handles provided by GDI 304 (block 410 of FIG. 4).

When the window size changes (block 710), IGS 310 handles the window size change (block 712). As with window shape and position changes, IGS 310 is informed of window size changes by either GDI 304 or MCIAVI 308 depending upon the embodiment. IGS 310 then determines the updated window size from the device context and window handles provided by GDI 304 (block 410 of FIG. 4).

For purposes of this specification, the handling of changes to the shape, position, and/or size of video windows is collectively called window management. Window management also includes opening and closing video channels, chromakeying and alpha blending.

In conventional video systems such as video system 100 of FIG. 1, window management is performed by Microsoft® Windows GDI. In video system 200 of FIG. 3 according to the present invention, when GDI access mode is not selected, responsibilities for window management are shared by IGS 310 and IDS 306.

If IDS 306 supports window management, it may do so using either clipping or chromakeying. If IDS 306 supports clipping, it may or may not need to be supplied with a clip list. IDS 306 may support chromakeying via an arbitrary or fixed color format. IGS 310 supports chromakeying via RGB channels (e.g., RGB32 or RGBAlpha32) or separate alpha channels (i.e., Alpha1 or Alpha8).

If IDS 306 does not support window management, then IGS 310 provides clipping support with a double-buffering approach in which IGS 310 first writes data to system memory 204. Then, if IDS 306 supports direct access, IGS 310 copies the appropriate video data directly to IDS memory 210. Otherwise, if IDS 306 supports indirect non-GDI access, then IGS 310 requires that IDS 306 provide window overlap capabilities with either clip lists or chromakeying.

After performing window management, IGS 310 decompresses the compressed image data (block 714) and, if necessary, converts the decompressed image data to a color format supported by IDS 306 (block 716). IGS 310 will perform this format conversion preferably only if IDS 306 does not support the color format of the decompressed data.

a. Handling Window Shape Changes

The way IGS 310 handles changes to the shape of the display window depends upon the capabilities supported by IDS 306.

If (a) IDS 306 supports clipping and (b) IDS 306 needs to be provided with a clip list and (c) IDS 306 supports chromakeying, then (1) IGS 310 generates a new clip list for the updated window, (2) IGS 310 sends the new clip list to IDS 306, and (3) IGS 310 updates the IDS chromakey buffer in IDS memory 210 by one of the supported display access modes supported by IDS 306.

Figure 8:
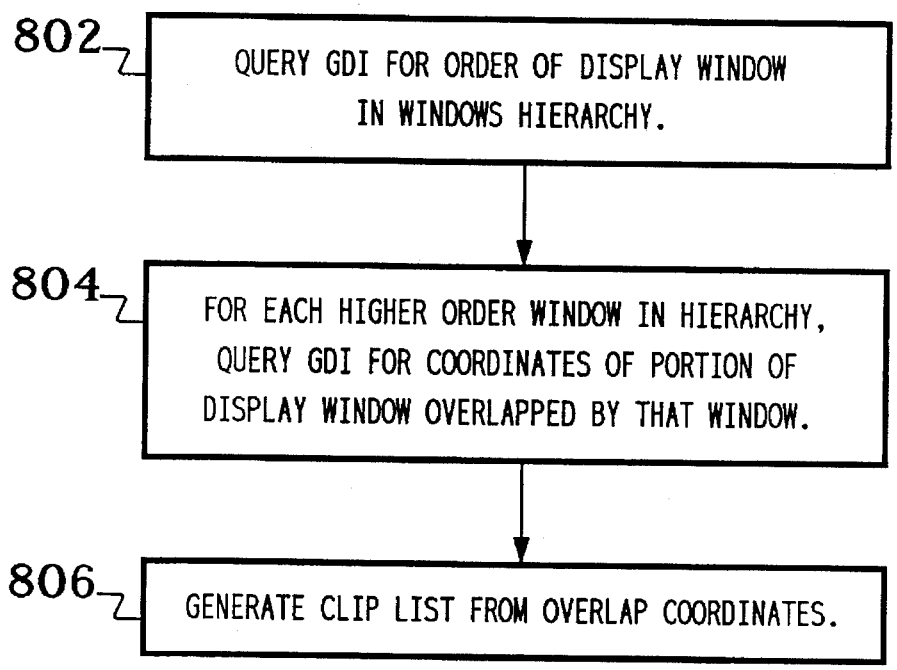
FIG. 8 is a process flow diagram of the generation of the clip list implemented by the image generation subsystem of the video system of FIGS. 2 and 3.

Referring now to FIG. 8, there is shown a process flow diagram of the generation of the clip list implemented by IGS 310, according to a preferred embodiment of the present invention. IGS 310 uses the device context and window handles to query GDI 304 for the order of the display window in the Windows hierarchy (block 802 of FIG. 8).

For each window that has a higher order in the Windows hierarchy, IGS 310 queries GDI 304 for the coordinates of the portion of the display window that is overlapped by the higher-order window (block 804). After all the overlap coordinates are collected in block 804, IGS 310 generates the clip list (block 806). Those skilled in the art will understand that a clip list is a mechanism for characterizing the shape of a display window. In a preferred embodiment, a clip list is a list of rectangular sub-windows, where the union of the sub-windows corresponds to the visible portion of the video image on display monitor 208.

If (a) IDS 306 supports-clipping and (b) IDS 306 does not need to be provided with a clip list and (c) IDS 306 supports chromakeying and (d) IDS 306 supports either the direct access mode or the non-GDI access mode, then (1) IGS 310 generates the clip list for the updated window and (2) IGS 310 uses the new clip list to update the IDS chromakey buffer in IDS memory 210.

If (a) IDS 306 does not support clipping at all and (b) IDS 306 supports chromakeying and (c) IDS 306 supports either the direct access mode or the non-GDI access mode, then (1) IGS 310 generates the clip list for the updated window and (2) IGS 310 uses the new clip list to update the IDS chromakey buffer in IDS memory 210.

If (a) IDS 306 supports clipping and (b) IDS 306 does not need to be provided with a clip list and (c) IDS 306 supports chromakeying and (d) IDS 306 supports neither the direct access mode nor the non-GDI access mode, then (1) IGS 310 updates the IDS chromakey buffer in IDS memory 210 via the GDI access mode.

If (a) IDS 306 does not support clipping at all and (b) IDS 306 supports chromakeying and (c) IDS 306 supports neither the direct access mode nor the non-GDI access mode, then (1) IGS 310 updates the IDS chromakey buffer in IDS memory 210 via the GDI access mode.

If (a) IDS 306 does not support clipping at all and (b) IDS 306 does not support chromakeying and (c) IDS 306 supports the direct access mode, then (1) IGS 310 copies only image pixels corresponding to the rectangular sub-windows in the clip list from system memory 204 to the frame buffer of IDS memory 210. Those skilled in the art will understand that IGS 310 need not copy all the image pixels corresponding to the clip list. In order to take advantage of video image temporal redundancy, IGS 310 will only copy those pixel coordinates that both (1) require updating and (2) correspond to the clip list.

In all cases, IDS 306 is then responsible for implementing any remaining processing required to handle completely the window shape change.

b. Handling Window Position Changes

When notified by either GDI 304 or MCIAVI 308 that the position of the display window has changed (block 706 Of FIG. 7), IGS 310 determines the new position using the device context and window handles and then notifies IDS 306 of the updated window position by calling the enhanced interface function ModifyVideoChannel. The function ModifyVideoChannel is described in further detail later in this specification in Section D.

c. Handling Window Size Changes

The way IGS 310 handles changes to the size of the display window depends upon the capabilities supported by IDS 306.

When notified by either GDI 304 or MCIAVI 308 that the size of the display window has changed (block 710 of FIG. 7), IGS 310 determines the new size using the device context and window handles. IGS 310 then closes the current video channel by calling the enhanced interface function CloseVideoChannel.

If (a) IDS 306 does not support stretching, then IGS 310 (1) defaults to the GDI access mode. In this case, IGS does not attempt to open a new video channel with IDS If (a) IDS 306 supports stretching in the X axis only and (b) IGS 310 determines that the display window has not been stretched along the Y axis, then (1) IGS 310 attempts to open a new video channel with IDS 306 by calling the enhanced interface function OpenVideoChannel. If the call to function OpenVideoChannel fails to open a new video channel, then IGS 310 defaults back to the GDI access mode. A new video channel may fail to be opened, if, for example, IDS 306 supports only integral stretching and the requested video channel requires fractional stretching.

If (a) IDS 306 supports stretching in the X axis only and (b) IGS 310 determines that the display window has been stretched along the Y axis, then (1) IGS 310 defaults back to the GDI access mode.

If (a) IDS 306 supports stretching in both the X and Y axes, then (1) IGS 310 attempts to open a new video channel with IDS 306 by calling the enhanced interface function OpenVideoChannel. If the call to function OpenVideoChannel fails to open a new video channel, then IGS 310 defaults back to the GDI access mode.

5. Display Access Modes

As described earlier in this specification in conjunction with FIG. 3, the enhanced interface of video system 200 supports three different modes of access by IGS 310 to IDS memory 210 of FIG. 2 (i.e., ways of getting video data from IGS 310 to IDS memory 210). GDI access mode (shown along path 312 of FIG. 3) is the same path used by conventional video system 100 of FIG. 1. In addition, the enhanced interface also supports direct access (shown along path 316) and indirect non-GDI access (shown along path 314).

IGS 310 always has GDI access mode available. In addition, IGS 310 may have one of either the direct access mode or the indirect non-GDI access mode available or neither. Whenever possible, in order to accelerate video processing, IGS 310 preferably selects the direct access mode or the indirect non-GDI access mode over the GDI access mode.

IGS 310 uses the selected display access mode to transfer different types of data to IDS memory 210. IGS 310 may transfer pixel data to the frame buffer in IDS memory 210. When IDS 306 performs video processing such as color conversion, stretching, and/or clipping, IGS 310 may transfer pixel coordinate data to an intermediate buffer in IDS memory addition, IGS 310 may transfer chromakey data to a chromakey buffer in IDS memory 210. Those skilled in the art will understand that IDS 386 may use the chromakey buffer to perform window clipping.

a. Direct Access Mode

The enhanced interface off-loads the task of configuring the display memory architecture from IGS 310 to IDS 306. That is, IDS 306 is responsible for configuring IDS memory 210 so that IGS 310 can have direct access to IDS memory 210. The enhanced interface provides a protocol for IGS 310 to ask IDS 306 to configure the display memory architecture. The protocol allows IGS 310 to be free of any IDS specific tasks by off-loading all IDS specific tasks to IDS 306.

IGS 310 tells IDS 306 the location within the display raster for the source image and the size of the source image.

IGS 310 then asks IDS 306 to configure the display memory architecture so that data corresponding to a given location in the source image can be written by IGS 310 directly into IDS memory 210. IGS 310 expects IDS 306 to configure IDS memory 210 such that the particular location in IDS memory 210 is accessible and to return to IGS 310 an address corresponding to the location. IGS 310 also expects a second address that tells IGS 310 how far in display memory 210 it can continue writing before the protocol must be reestablished.

Figure 9:
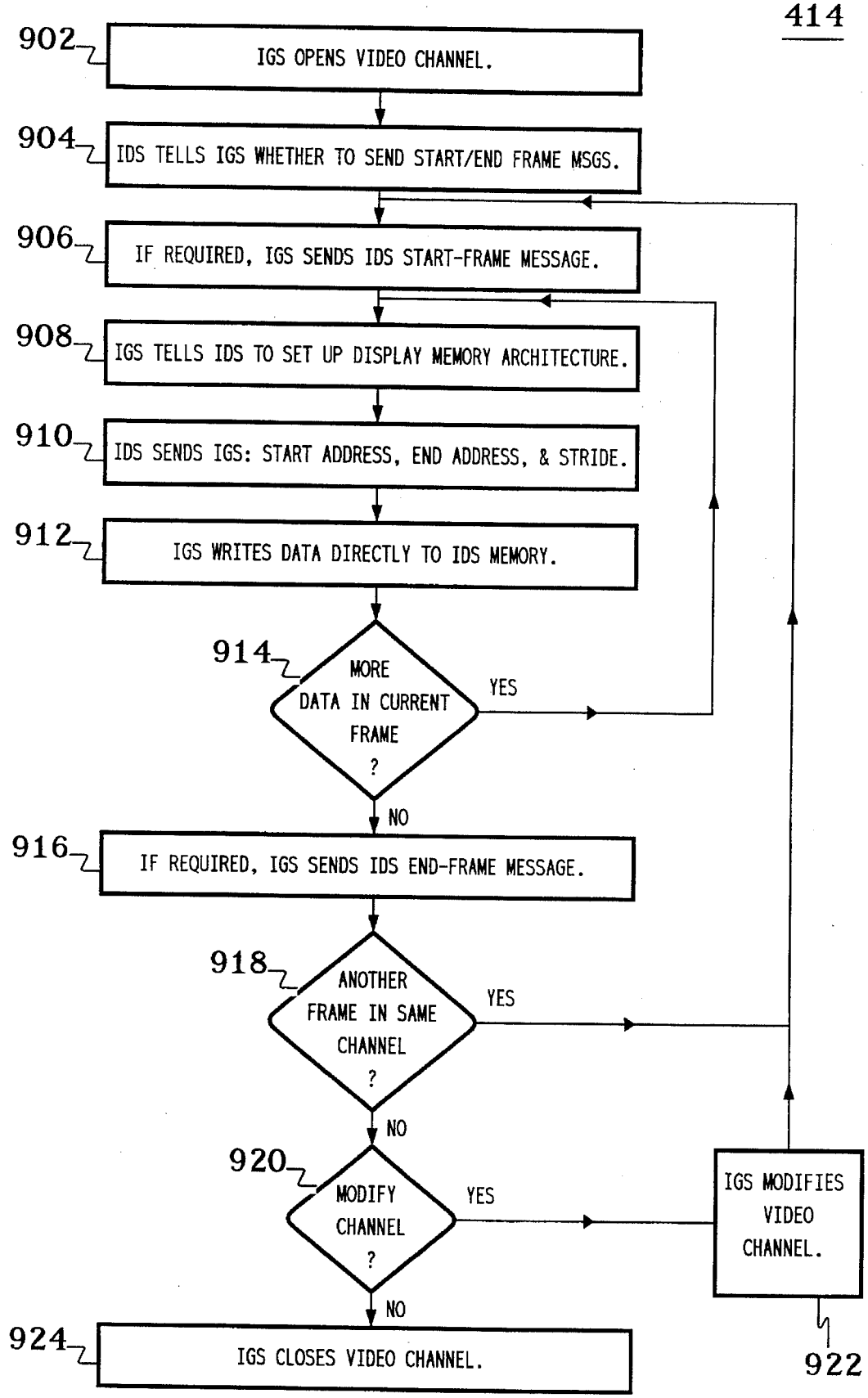
FIG. 9 is a process flow diagram of the direct access mode implemented by the image generation subsystem and the image display subsystem of the video system of FIGS. 2 and 3.

Referring now to FIG. 9, there is shown a process flow diagram of the direct access mode implemented by image generation subsystem 310 and image display subsystem 306 of video system 200 (block 414 of FIG. 4), according to a preferred embodiment of the present invention. If IDS 306 supports direct access and if IGS 310 selects the direct access mode, then the direct access mode processing of FIG. 9 is implemented to transfer image data for the current video frame that have been processed by IGS 310 (FIG. 7 and block 412 of FIG. 4).

IGS 310 instructs IDS 306 to open a video channel by calling enhanced interface function OpenVideoChannel (block 902). When IGS 310 opens a video channel, IGS 310 provides IDS 306 certain parameter values, such as the size of the source image and the display window handle. Using the display window handle, IDS 306 is capable of deriving the size and location of the image destination window in the frame buffer in IDS memory 210. Those skilled in the art will understand that, in typical windowed displays, destination image size and location change infrequently relative to video frame rates. By opening a video channel, IGS 310 informs IDS 306 of parameter values that are to be applied to the subsequent series of video images. These parameter values remain in effect until IGS 310 modifies the video channel (via enhanced interface function ModifyVideoChannel) or closes the video channel (via enhanced interface function CloseVideoChannel).

In response to IGS 310 calling OpenVideoChannel (block 902), IDS 306 tells IGS 310 whether IGS 310 needs to inform IDS 306 of the start and end of each video frame update in IDS memory 210 performed by IGS 310 (block 904). If so, then IGS 310 sends IDS 306 a start-frame message by calling the enhanced interface function StartDevMemAccess (block 906).

IGS 310 then requests IDS 306 to set up the display memory architecture by calling the enhanced interface function GetDevMemAccess (block 908). When calling GetDevMemAccess, IGS 310 passes to IDS 306 a specified location in the source image (or a location in the chromakey buffer corresponding to the source image). IDS 306 sets up the display memory architecture by configuring IDS memory 210 so that video data corresponding to the source image location can be transferred directly by IGS 310 to the corresponding location in a buffer (e.g., frame buffer, intermediate buffer, or chromakey buffer) in IDS memory 210.

In response to IGS 310 calling GetDevMemAccess, IDS 306 returns to IGS 310 values for four parameters: selector, start offset, end offset, and stride (block 910). The selector refers to the IDS memory segment. The start offset and end offset are offsets into the IDS memory segment that correspond to the first and last locations in IDS memory 210 available to IGS 310 for the current display memory architecture. The start offset is the address of the specified location. The stride (i.e., pitch) corresponds to the width of the buffer in IDS memory 210 into which IGS 310 is to write. The stride is the value to add to the address of one pixel to get the address of the pixel directly below. IGS 310 uses the stride value to write data to IDS memory 210 from two or more different rows of the source image. IDS 306 determines the selector, start offset, end offset, and stride values from the source image size, the source image location, the device context handle, the window handle, and its own internal data structures.

IGS 310 may then write video data corresponding to the portion of the buffer in IDS memory 210 defined by the start and end offsets (block 912). IGS 310 may write as much or as little video data as it needs to write to update that portion of the IDS buffer. These may be only one pixel coordinate, non-consecutive pixel coordinates, or all of the pixel coordinates corresponding to the IDS buffer portion.

If IGS 310 has more video data to write to IDS memory 210 for the current video frame (block 914), then processing returns to repeat blocks 908 through 912. Otherwise, if IDS 306 had requested to be informed of the end of each video frame update (block 904), then IGS 310 sends IDS 306 an end-frame message by calling the enhanced interface function DoneDevMemAccess (block 916). In general, the video processing implemented by IDS 306 to display the video data in IDS memory 210 is transparent to IGS 3 10.

If another video frame is to be displayed in the current video channel (block 918), then processing returns to repeat blocks 906 through 916. Otherwise, if any of the channel parameters need to be changed (e.g., if the position of the display window in the display raster changes) (block 920), then IGS modifies the video channel by calling the enhanced interface function ModifyVideoChannel (block 922) before processing returns to repeat blocks 906 through 918. Otherwise, IGS 310 closes the video channel by calling the enhanced interface function CloseVideoChannel (block 924).

Those skilled in the art will understand that the direct access mode supported by video system 200 removes the need for IGS 310 to have any hard-coded information regarding the specifics of IDS 306. IDS 306 is responsible for configuring the display memory architecture. Whatever information IGS 310 needs to write data directly to IDS memory 210 is provided to IGS in real time by IDS 306 in response to enhanced interface functions called by IGS It will also be understood that, with the enhanced interface, IGS 310 is abstracted from IDS 306 and IDS memory 210. That is, IGS 310 is compatible with any display memory architecture, for example, with either linear frame buffering or a bank-switched scenario with either fixed banks or sliding banks of any bank size.

As such, the enhanced interface removes the need for IDS specific code in IGS 310 thereby reducing the code size and processing requirements of IGS 310. The enhanced interface also allows improvements to be made to IDS 306 and IDS memory 210 without affecting compatibility with IGS 310. Direct access may be used to improve the overall performance of video system 200 by reducing data transfer by taking advantage of the temporal redundancy of video data by transferring only those pixel components that need to be updated.

b. Indirect Non-GDI Access Mode

Figure 10:
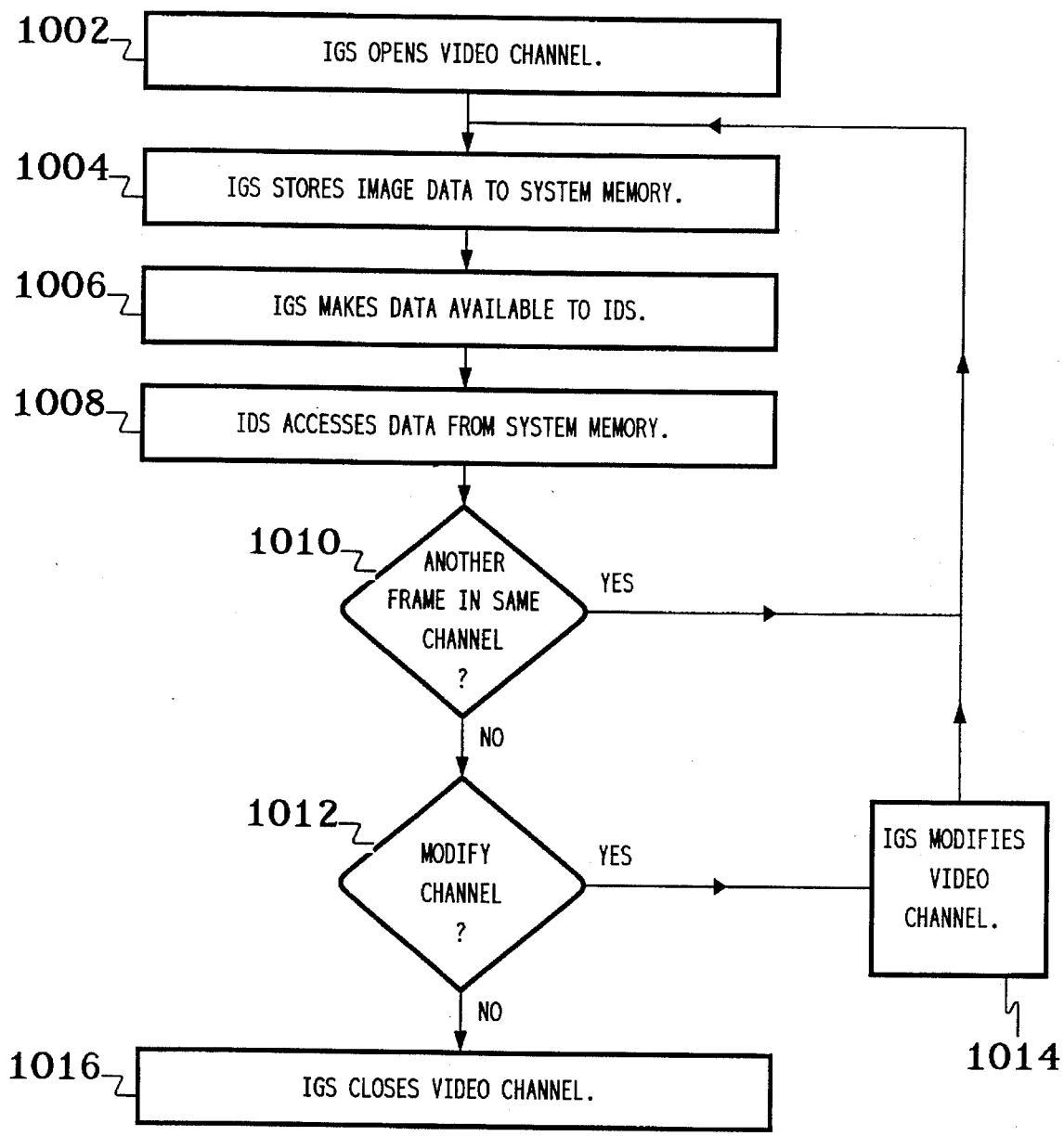
FIG. 10 is a process flow diagram of the indirect non-GDI access mode implemented by the image generation subsystem and the image display subsystem of the video system of FIGS. 2 and 3.

Referring now to FIG. 10, there is shown a process flow diagram of the indirect non-GDI access mode implemented by image generation subsystem 310 and image display subsystem 306 of video system 200 (block 414 of FIG. 4), according to a preferred embodiment of the present invention. If IDS 306 supports indirect non-GDI access and if IGS 310 selects the indirect non-GDI access mode, then the indirect non-GDI access mode processing of FIG. 10 is implemented to transfer image data for the current video frame that have been processed by IGS 310 (FIG. 7 and block 412 of FIG. 4).

IGS 310 instructs IDS 306 to open a video channel by calling enhanced interface function OpenVideoChannel (block 1002). IGS 310 stores video data (to be transferred to IDS memory 210) to system memory 204 (block 1004). IGS 310 makes the video data available to IDS 306 by calling the enhanced interface function DoVideoXfer (block 1006), which passes IDS 306 a pointer to the location of the video data in system memory 204. IDS 306 then accesses the video data from system memory 204 (block 1008).

If another video frame is to be displayed in the current video channel (block 1010), then processing returns to repeat blocks 1004 through 1008. Otherwise, if any of the channel parameters need to be changed (e.g., if the position of the display window in the display raster changes) (block 1012), then IGS modifies the video channel by calling the enhanced interface function ModifyVideoChannel (block 1014) before processing returns to repeat blocks 1006 through 1010. Otherwise, IGS 310 closes the video channel by calling the enhanced interface function CloseVideoChannel (block 1016).

In an alternative preferred embodiment of the present invention, blocks 1006 and 1008 are combined into a single block in which IGS 310 sends the video data from system memory 204 to IDS memory 210.

In either preferred embodiment, in order for IGS 310 to use the DoVideoXfer function, IDS 306 preferably must support some form of either clipping or chromakeying or both.

Those skilled in the art will understand that, although the indirect non-GDI access mode does not permit IGS 310 to take advantage of video temporal redundancy, it does permit IGS 310 to send video data to IDS memory 210 without having to go through MCIAVI 308 and GDI 304. As such, data transfer is still accelerated over that provided by the GDI access mode. Moreover, like the direct access mode, the indirect non-GDI access mode permits IGS 310 to transfer video data to IDS 306 in IDS-supported color formats other than the limited few supported by MCIAVI 308 and GDI 304.

c. Updating Chromakey Buffers

The mechanism for IGS 310 updating chromakey buffers in IDS memory 210 varies depending upon the selected display access mode. In the GDI access mode, IGS 310 generates a chromakey bitmap in system memory 204 and makes a GDI function call to block transfer (i.e., BLT) the chromakey bitmap to IDS memory 210. In the direct access mode, IGS 310 paints the IDS-specified chromakey color only to the portions of the chromakey buffer in IDS memory 210 indicated by the chromakey clip list. In the indirect non-GDI access mode, IGS 310 paints the IDS-specified chromakey color to a chromakey bitmap in system memory 204. IGS 310 then calls DoVideoXfer to transfer the chromakey bitmap to IDS memory D. Enhanced Interface Functions Referring now to Table I, there are listed a set of preferred functions supported by the enhanced interface of video system 200 of FIGS. 2 and 3.

TABLE I

Enhanced Interface Functions

| Function | Description |
|---|---|
| (Query functions) | |
| QueryColorSupport | Queries IDS for list of supported color formats |
| QueryDisplayAccessSupport | Queries IDS for display access options |
| QueryClippingSupport | Queries IDS for clipping support options |
| QueryChromaKeySupport | Queries IDS for chromakeying color format |
| QueryStretchSupport | Queries IDS for stretching options |
| (Video channel functions) | |
| OpenVideoChannel | Opens video channel to IDS |
| CloseVideoChannel | Closes video channel with IDS |
| ModifyVideoChannel | Modifies video channel with IDS |
| OpenChromaKeyChannel | Opens chromakey channel with IDS |
| (Direct access functions) | |
| GetDevMemAccess | Accesses IDS memory directly |
| StartDevMemAccess | Notifies IDS of start of IGS access to video frame in IDS memory |
| DoneDevMemAccess | Notifies IDS of end of IGS access to video frame in IDS memory |
| (Indirect Non-GDI access function) | |
| DoVideoXfer | Accesses IDS memory indirectly via non-GDI path |
| (Window management functions) | |
| GetChromaKeyColorValue | Gets chromakey color when chromakey color is fixed or selectable from a small range of values |
| SetChromaKeyColorValue | Selects chromakey color when IDS supports variable chromakey color |
| SetClipList | Passes clip list to IDS |

1. Query Functions a. QueryColorSupport

The preferred C language format for a call to function QueryColorSupport is provided below:

void FAR PASCAL QueryColorSupport (HANDLE hDstWnd, HANDLE hDstDc, COLORSUPPORT far * lpSupportedColors)

The image generation subsystem uses the QuerycolorSupport function to determine the color formats supported by the image display subsystem, if any. The arguments are:

HANDLE hDstWnd: Specifies a handle to the window where drawing occurs;

HANDLE hDstDc: Specifies a device context handle corresponding to the specified window; and COLORSUPPORT far *lpSupportedColors: A pointer to a list of COLORSUPPORT values filled in by IDS.

QueryColorSupport passes the IDS the window and device context handles. The IDS responds to QueryColorSupport by setting the far pointer lpSupportedColors equal to the location of a list of values corresponding to the colors supported by the IDS. The list is terminated by the value for NoColorSupport (preferably 0). If color formats are not supported by IDS, then the IDS returns a list whose only entry is a NoColorSupport value.

The color formats preferably supported by the IGS and the corresponding list values are tabulated in Table II.

TABLE II

Supported Color Formats and Values

| FORMAT | VALUE |
|---|---|
| NoColorSupport | 0 |
| YVU9_Planar | 1 |
| YUV411_Packed | 2 |
| YVU12_Planar | 3 |
| YUV422_Packed | 4 |
| RGB8_CLUT | 5 |
| RGB16_555 | 6 |
| RGB16_565 | 7 |
| RGB24_888 | 8 |
| YVU9_Packed | 9 |
| YVU12_Packed | 10 |
| RGB32 | 11 |
| RGBAlpha32 | 12 |
| Alpha1 | 13 |
| Alpha8 | 14 |
| YUV211_Packed | 15 | b. QueryDisplayAccessSupport

The preferred C language format for a call to function QueryDisplayAccessSupport is provided below:

DISPLAYACCESSSUPPORT FAR PASCAL QueryDisplayAccessSupport (HANDLE hDstWnd, HANDLE hDstDc, COLORSUPPORT Color)

The IGS uses the QueryDisplayAccessSupport function to determine the modes of display access supported by the IDS. The arguments. are:

HANDLE hDstWnd: Specifies a handle to the window where drawing occurs;

HANDLE hDstDc: Specifies a device context handle corresponding to the specified window; and COLORSUPPORT Color: Corresponds to a single value of type COLORSUPPORT, returned by the IDS from a previous QueryColorSupport call.

The IDS responds to QueryDisplayAccessSupport by returning one of the following three values of type DISPLAYACCESSSUPPORT:

NoDisplayAccessSupport=0

AccessToDeviceMemory=1

AccessViaBlit=2 where 0 means that the IDS supports only the GDI access mode; 1 means that the IDS supports both the GDI and direct access modes; and 2 means that the IDS supports both GDI and indirect non-GDI access modes.

c. QueryClippingSupport

The preferred C language format for a call to function QueryclippingSupport is provided below:

CLIPPINGSUPPORT FAR PASCAL QueryClippingSupport (HANDLE hDstWnd, HANDLE hDstDc, COLORSUPPORT Color)

The IGS uses the QueryClippingsupport function to determine the types of clipping supported by the IDS, if any. The arguments are:

HANDLE hDstWnd: Specifies a handle to the window where drawing occurs;

HANDLE hDstDc: Specifies a device context handle corresponding to the specified window; and COLORSUPPORT Color: Corresponds to a single value of type COLORSUPPORT, returned by the IDS from a previous QueryColorSupport call.

The IDS responds to QueryClippingSupport by returning one of the following three values of type DISPLAYCLIPPINGSUPPORT:

NoClippingSupport=0
ClippingSupportedNeedList=1
ClippingSupportedDontNeedList=2
where 0 means that the IDS does not support clipping at all; 1 means that the IDS supports clipping and needs to be provided with a clip list; and 2 means that the IDS supports clipping and does not need to be provided with a clip list.

d. QueryChromaKeySupport

The preferred C language format for a call to function QueryChromaKeySupport is provided below:

COLORSUPPORT FAR PASCAL QueryChromaKeySupport (HANDLE hDstWnd, HANDLE hDstDc, COLORSUPPORT Color)

The IGS uses the QueryChromaKeySupport function to determine the types of clipping supported by the IDS, if any. The arguments are:

HANDLE hDstWnd: Specifies a handle to the window where drawing occurs;

HANDLE hDstDc: Specifies a device context handle corresponding to the specified window; and COLORSUPPORT Color: Corresponds to a single value of type COLORSUPPORT, returned by the IDS from a previous QueryColorSupport call.

The color passed to the IDS in the function call is preferably one of the IDS-supported color formats for three-component image data, such as YVU9_Planar or RGB16_555. The IDS responds to QueryChromaKeySupport by returning one of the values returned in a previous QueryColorSupport call that corresponds to a chromakeying color format. Those skilled in the art will understand that color formats RGB32 and RGBAlpha32 may be used for either three-component image data or chromakey data or both.

The IGS then uses the returned color as the chromakey color. Table III contains the chromakey color formats preferably supported by the IGS. If IDS does not support chromakeying, QueryChromaKeySupport returns the value NoColorSupport (which is preferably 0).

TABLE III

Supported Chromakey Color Formats and Values

| FORMAT | VALUE |
| --- | --- |
| NoColorSupport | 0 |
| RGB8_CLUT | 5 |
| RGB16_555 | 6 |
| RGB16_565 | 7 |
| RGB24_888 | 8 |
| RGB32 | 11 |
| RGBAlpha32 | 12 |
| Alpha1 | 13 |
| Alpha8 | 14 | e. QueryStretchSupport

The preferred C language format for. a call to function QueryStretchSupport is provided below:

STRETCHSUPPORT FAR PASCAL QueryStretchSupport (HANDLE hDstWnd, HANDLE hDstDc, RECT rSrc, COLORSUPPORT Color)

The IGS uses the QueryStretchSupport function to determine the types of stretching supported by the IDS, if any. The arguments are:

HANDLE hDstWnd: Specifies a handle to the window where drawing occurs;

HANDLE hDstDc: Specifies a device context handle corresponding to the specified window;

RECT rSrc: A RECT structure indicating the size of the source image in the displayed clip; and COLORSUPPORT Color: Corresponds to a single value of type COLORSUPPORT, returned by the IDS from a previous QuerycolorSupport call.

The IDS responds to QueryStretchSupport by returning one of the following three values of type STRETCHSUPPORT:

| | |
| --- | --- |
| NoStretchSupport | = 0 |
| XAxisOnly | = 1 |
| XAndYAxis | = 2 | where 0 means that the IDS does not support stretching at all; 1 means that the IDS supports stretching the X axis only; and 2 means that the IDS supports stretching in both X and Y axes.

2. Video Channel Functions a. OpenVideoChannel

The preferred C language format for a call to function OpenVideoChannel is provided below:

HANDLE FAR PASCAL OpenVideoChannel (HANDLE hDstWnd, HANDLE hDstDc, RECT rSrc, COLORSUPPORT Color, CHANNELFUNCTIONS far *lpChannelFunctions)

The IGS uses the OpenVideoChannel function to open a video channel with the IDS by providing the IDS with static parameters for the video window. The arguments are:

HANDLE hDstWnd: Specifies a handle to the window where drawing occurs;

HANDLE hDstDc: Specifies a device context handle corresponding to the specified window;

RECT rSrc: A RECT structure indicating the size of the source image in the displayed clip;

COLORSUPPORT Color: Corresponds to a single value of type COLORSUPPORT, returned by the IDS from a previous QueryColorSupport call; and CHANNELFUNCTIONS far *lpChannelFunctions: A pointer to a channel functions structure to be filled in.

The ChannelFunctions structure is defined as follows:

```
typedef struct
{
    void ( PASCAL FAR * fpGetDevMemAccess) ( );
    void ( PASCAL FAR * fpStartDevMemAccess) ( );
    void ( PASCAL FAR * fpDoneDevMemAccess) ( );
    DWORD ( PASCAL FAR *
    fpGetChromaKeyColorValue) ( );
    void ( PASCAL FAR * fpSetChromaKeyColorValue) ( );
    void ( PASCAL FAR * fpSetClipList) ( );
    void ( PASCAL FAR * fpDoVideoXfer) ( );
} ChannelFunctions;
```

The IDS responds to OpenVideoChannel by returning an IDS-dependent video channel handle of type HANDLE used to identify future transactions. The IDS also responds by setting the far pointer lpChannelFunctions equal to the location of the ChannelFunctions structure. The ChannelFunctions structure contains eight function address fields. The functions provide access to the tasks that the IGS preferably supports to accelerate motion video display. Not all functions need be supported. If a function is not supported, its address field is preferably set to null. The OpenVideoChannel function preferably always resets address fields fpGetChromaKeyColorValue and fpSetChromaKeyColorValue to null.

b. CloseVideoChannel

The preferred C language format for a call to function CloseVideoChannel is provided below:

void FAR PASCAL CloseVideoChannel (HANDLE hChannel)

The IGS uses the CloseVideoChannel function to close a video channel. The argument is:

HANDLE hChannel: Specifies the channel handle from a previous OpenVideoChannel function call.

The IDS responds to CloseVideoChannel by freeing buffers and performing similar management functions that may be required. Any associated chromakey channels that are open are also closed.

c. ModifyVideoChannel

The preferred C language format for a call to function ModifyVideoChannel is provided below:

void FAR PASCAL ModifyVideoChannel (HANDLE hChannel, HANDLE hDstWnd, HANDLE hDstDc, RECT rSrc, COLORSUPPORT Color, CHANNELFUNCTIONS far *lpChannelFunctions)

The IGS uses the ModifyVideoChannel function to modify an open video channel. The arguments are:

HANDLE hChannel: Specifies the channel handle from a previous OpenVideoChannel function call;

HANDLE hDstWnd: Specifies a handle to the window where drawing occurs;

HANDLE hDstDc: Specifies a device context handle corresponding to the specified window;

RECT rSrc: A RECT structure indicating the size of the source image in the displayed clip;

COLORSUPPORT Color: Corresponds to a single value of type COLORSUPPORT, returned by the IDS from a previous QueryColorSupport call; and CHANNELFUNCTIONS far *lpChannelFunctions: Pointer to a channel functions structure to be filled in.

The ModifyVideoChannel notifies the IDS of changes to one or more static video channel parameters, such as the size of the display window. The IDS is responsible for making similar changes to any associated chromakey channels.

d. OpenChromaKeyChannel

The preferred C language format for a call to function OpenChromaKeyChannel is provided below:

HANDLE FAR PASCAL OpenChromaKeyChannel (HANDLE hChannel; CHANNELFUNCTIONS far *lpChannelFunctions)

The IGS uses the OpenChromaKeyChannel function to open a chromakey channel with the IDS to be associated with an open video channel. The arguments are:

HANDLE hChannel: Identifies the video channel from a previous OpenVideoChannel function call; and CHANNELFUNCTIONS far *lpChannelFunctions: A pointer to the channel functions structure to be filled in.

The IDS responds to OpenChromaKeyChannel by returning an IDS-dependent chromakey channel handle of type HANDLE used to identify future transactions. The IDS also responds by setting the far pointer lpChannelFunctions equal to the location of the ChannelFunctions structure. The chromakey channel is associated with an open video channel by the hChannel parameter. When the IGS modifies or closes a video channel, a separate call to modify or close the associated chromakey channel is preferably not required. The IDS is responsible for making the appropriate changes to the associated chromakey channel. Invoking the OpenChromaKeyChannel function call sets fpSetClipList to null.

3. Direct Access Functions a. GetDevMemAccess

The preferred C language format for a call to function GetDevMemAccess is provided below:

void PASCAL FAR GetDevMemAccess (HANDLE hChannel, POINT RGBpt, DWORD YUVoffset, WORD far *lpSelector, DWORD far *lpStartOffset, DWORD far *lpEndOffset, WORD far *lpStride);

The IGS uses the GetDevMemAccess function to access the IDS memory using the direct access mode. The arguments are:

HANDLE hChannel: Identifies the channel from a previous OpenVideoChannel or OpenChromaKeyChannel function call;

POINT RGBpt: The location in window coordinates from which the IGS wants to begin IDS memory access;

DWORD YUVoffset: An offset used to support color formats (e.g., YUV) when window coordinates do not apply;

WORD far *lpSelector: The selector for lpStartOffset and lpEndOffset corresponding to the location specified by either RGBpt or YUVoffset;

DWORD far *lpStartOffset: The address in IDS memory of the location specified by either RGBpt or YUVoffset;

DWORD far *lpEndOffset: The address of the last available location in currently accessible IDS memory; and WORD far *lpStride: The number of bytes from one point to the point directly below it in the IDS memory buffer.

The IGS calls the GetDevMemAccess function with the channel handle that identifies a previously opened channel (i.e., video or chromakey) and the x,y coordinate of the location in window coordinates from which IDS memory access is desired. The location is relative to the source image rectangle associated with the channel (coordinates are preferably top to bottom, left to right).

The IDS is responsible for configuring the display memory architecture. As such, the IDS sets up the IDS memory to enable the IGS to write to an IDS memory area beginning with the location by the IGS in the function call. The IDS response to the GetDevMemAccess function includes returning the IDS memory address that corresponds to the IGS-specified window location.

To enable the IGS to access bank-switched IDS memory devices, the IDS response also includes the last valid IDS memory address to which the IGS can write before GetDevMemAccess is called again. In a linear frame buffered system, the last valid IDS memory address is preferably the end address of the IDS memory.

To handle addresses in very large IDS memory devices, the start and end addresses are preferably identified in terms of a selector and offsets from that selector.

The IDS also returns the stride, which defines the separation in bytes between a pixel in one row and a pixel in the same column in the next row.

b. StartDevMemAccess

The preferred C language format for a call to function StartDevMemAccess is provided below:

void PASCAL FAR StartDevMemAccess (HANDLE hChannel);

The IGS uses the StartDevMemAccess function to notify the IDS that the IGS is beginning to update the data for a new video frame. The argument is:

HANDLE hChannel: Identifies the channel from a previous OpenVideoChannel or OpenChromaKeyChannel function call.

The IGS preferably requires no response by the IDS. The StartDevMemAccess function is provided as a service to the IDS, which may use the notification to trigger IDS-specific processing, such as synchronizations.

c. DoneDevMemAccess

The preferred C language format for a call to function DoneDevMemAccess is provided below:

void PASCAL FAR DoneDevMemAccess (HANDLE hChannel);

The IGS uses the DoneDevMemAccess function to notify the IDS that the IGS has completed the update of data for the current video frame. The argument is:

HANDLE hChannel: Identifies the channel from a previous OpenVideoChannel or OpenChromaKeyChannel function call.

The IGS preferably requires no response by the IDS. The DoneDevMemAccess function is provided as a service to the IDS, which may use the notification to trigger IDS-specific processing, such as transferring data from an off-screen (i.e., intermediate) buffer in the IDS memory to the visible (i.e., frame) buffer in the IDS memory.

4. Indirect Non-GDI Access Function a. DoVideoXfer

The preferred C language format for a call to function DoVideoXfer is provided below:

void PASCAL FAR DoVideoXfer (HANDLE hChannel, VOID far *lpData);

The IGS uses the DoVideoXfer function to access the IDS memory using the indirect non-GDI access mode. The arguments are:

HANDLE hChannel: Identifies the channel from a previous OpenVideoChannel or OpenChromaKeyChannel function call; and VOID far *lpData: Pointer to video frame or chromakey data. This pointer reads left to right, top to bottom. The data are in the color format that corresponds to the currently opened video or chromakey channel.

The IGS uses the DoVideoXfer function to transfer data from the system memory to the IDS memory using the indirect non-GDI access mode. The IGS may also use the DoVideoXfer function if the IDS needs to be activated to transfer data from an off-screen (i.e., intermediate) buffer in the IDS memory to the visible (i.e., frame) buffer in the IDS memory. The DoVideoXfer function may also be used to support stretching. The parameters for the stretch established during the OpenVideoChannel or OpenChromaKeyChannel function call are in effect until the channel is modified or closed. (Note that if the IDS supports the DoVideoXfer function, the IDS also preferably supports clipping.)

5. Window Management Functions

The following window management functions ensure that the IGS does not overwrite IDS memory areas belonging to other applications.

a. GetChromaKeyColorValue

The preferred C language format for a call to function GetChromaKeyColorValue is provided below:

DWORD PASCAL FAR GetChromaKeyColorValue (HANDLE hChannel)

The IGS calls the OpenChromaKeyChannel function before calling the GetChromaKeyColorValue function. The IGS uses the GetChromaKeyColorValue function to determine the chromakey color supported by the IDS, if any. The argument is:

HANDLE hChannel: Identifies the channel from a previous OpenChromaKeyChannel function call.

The IDS responds to GetChromaKeyColorValue by returning a DWORD value that depends on the color type supported by the IDS. For example, if the color type is an RGB_16 value, the low WORD of the DWORD has an RGB_16 value. The format returned from the QueryChromaKeySupport function call determines the bit pattern of the DWORD returned.

The IDS supports the GetChromaKeyColorValue function, if the IDS supports clipping via chromakeying and if the chromakey color is either a fixed value or is selectable from a limited range of values. The IGS expects that the color returned by the IDS is unique for chromakeying to avoid possible bleed through. If the chromakey color can be arbitrarily set, then the IDS preferably does not support the GetChromaKeyColorValue function. If the returned value occupies less than DWORD space, only the bytes corresponding to color type are valid.

b. SetChromaKeyColorValue

The preferred C language format for a call to function SetChromaKeyColorValue is provided below:

void PASCAL FAR SetChromaKeyColorValue (HANDLE hChannel, DWORD Color);

The IGS calls the OpenChromaKeyChannel function before the SetChromaKeyColorValue function is called. The IGS uses the SetChromaKeyColorValue function to specify the chromakey color, when the IDS supports an arbitrary chromakey color. The arguments are:

HANDLE hChannel: Identifies the channel from a previous OpenChromaKeyChannel function call; and DWORD Color: A color that corresponds to the type of open channel, right justified in the DWORD. If the chromakey color is a fixed value, the IDS preferably does not support the SetChromaKeyColorValue function. The DWORD color is right-justified regardless of the color format (i.e., an 8-bit value returned in a DWORD is in the low-order byte, while a 16-bit value is returned in the low-order word).

If the IDS supports arbitrary chromakey color values, then GetChromaKeyColorValue preferably has a null address and SetChromaKeyColorValue preferably has a valid address in the channel functions structure. If, however, the IDS supports fixed chromakey color values, then GetChromaKeyColorValue preferably has a valid address and SetChromaKeyColorValue preferably has a null address in the channel functions structure. If the IDS supports selection of chromakey color from a limited range of values, then both GetChromaKeyColorValue and SetChromaKeyColorValue preferably have valid addresses in the channel functions structure.

If the IDS does not support clipping but does support the direct access mode, then the IGS writes data directly into clipped areas in the IDS memory. If the IDS does not support clipping and if the IDS does not support the direct access mode, then the IGS selects the GDI access mode, even if the IDS supports the indirect non-GDI access mode.

If the IDS supports clipping and needs to be provided with a clip list and if the IDS supports either the direct or indirect non-GDI access modes, then the IGS writes an entire image to the IDS memory and provides the IDS with the clip list via the SetClipList function.

If the IDS supports clipping and does not need to be provided with a clip list and if the IDS supports either the direct or indirect non-GDI access modes, then the IGS writes an entire image to the IDS memory, but does not provide the IDS with the clip list.

c. SetClipList

The preferred C language format for a call to function SetClipList is provided below:

void PASCAL FAR SetClipList (HANDLE hChannel, RECT far *lpClipList);

The IGS uses the SetClipList function to pass a new clip list to the IDS whenever the window shape changes. The IDS continues to use the same clip list until the clip list is updated via SetClipList or until the video channel is closed. The arguments are:

HANDLE hChannel: Specifies the channel from a previous OpenVideoChannel function call; and RECT far *lpClipList: A pointer to a clip list (i.e., an array of clipping rectangles).

The IDS supports the SetClipList function preferably only if the IDS supports clipping. The clip list structure passed is an array of rectangles. The end of the clip list is preferably denoted by an empty rectangle.

E. Enhanced Interface Data Structures

This section contains descriptions of the data structures used with the enhanced interface functions, according to a preferred embodiment of the present invention.

The following are the types of color formats that may be supported by the IDS:

```
enum ColorSupport
{
        NoColorSupport      = 0,
        YVU9_Planar         = 1,
        YUV411_Packed       = 2,
        YVU12_Planar        = 3,
        YUV422_Packed       = 4,
        RGB8_CLUT           = 5,
        RGB16_555           = 6,
        RGB16_565           = 7,
        RGB24_888           = 8,
        YVU9_Packed         = 9,
        YVU12_Packed        = 10,
        RGB32               = 11,
        RGBAlpha32          = 12,
        Alpha1              = 13,
        Alpha8              = 14,
        YUV211_Packed       = 15
};
```

The following are the types of access mode that may be supported by the IDS:

```
enum DisplayAccessSupport
{
        NoDisplayAccessSupport  = 0,
        AccessToDeviceMemory    = 1,
        AccessViaBlit           = 2
};
```

The following are the types of clipping that may be supported by the IDS:

```
enum ClippingSupport
{
        NoClippingSupport             = 0,
        ClippingSupportedNeedList     = 1,
        ClippingSupportedDontNeedList = 2
};
```

The following are the types of stretching that may be supported by the IDS:

```
enum StretchSupport
{
        NoStretchSupport    = 0,
        XAxisOnly           = 1,
        XAndYAxis           = 2
};
```

The following is the channel functions structure used to supply the IGS with the functions supported by the IDS:

```
typedef struct
{
        void ( PASCAL FAR * fpGetDevMemAccess) ( );
        void ( PASCAL FAR * fpStartDevMemAccess) ( );
        void ( PASCAL FAR * fpDoneDevMemAccess) ( );
        DWORD ( PASCAL FAR *
fpGetChromaKeyColorValue) ( );
        void ( PASCAL FAR *
fpSetChromaKeyColorValue) ( );
        void ( PASCAL FAR * fpSetClipList) ( );
        void ( PASCAL FAR * fpDoVideoXfer) ( );
} ChannelFunctions;
```

| | | |
|---|---|---|
| #define CLIPLIST | | LPRECT |
| #define COLORSUPPORT | | enum ColorSupport |
| #define DISPLAYACCESSSUPPORT | enum | DisplayAccessSupport |
| #define CLIPPINGSUPPORT | | enum ClippingSupport |
| #define STRETCHSUPPORT | | enum StretchSupport |
| #define CHANNELFUNCTIONS | | ChannelFunctions |
| #define NCOLORFORMATS | | 16 |

F. IGS-Supported Subsampled YUV Color Formats

This section describes planar and packed subsampled YUV color formats that are supported by IGS 310 of video system 200 of FIG. 3, according to a preferred embodiment of the present invention. For each of the following YUV color formats, there is a one-to-one relationship between image pixels and Y components. The subsampling is with respect to the U and V components.

1. Planar YUV Color Formats a. YVU9_Planar

In YVU9_Planar format, for every (4×4) block of one-byte Y components, there are one one-byte V component and one one-byte U component. For a (160×120) pixel image, the video data sequence comprises the (160×120) Y components in left-to-right, top-to-bottom order (i.e., start at top left corner, proceed along first row, continue with left end of second row, etc.), followed by the (40×30) V components in left-to-right, top-to-bottom order, followed by the (40×30) U components in left-to-right, top-to-bottom order.

b. YVU12_Planar

In YVU12_Planar format, for every (2×2) block of one-byte Y components, there are one one-byte V component and one one-byte U component. For a (160×120) pixel image, the video data sequence comprises the (160×120) Y components in left-to-right, top-to-bottom order (i.e., start at top left corner, proceed along first row, continue with left end of second row, etc.), followed by the (80×60) V components in left-to-right, top-to-bottom order, followed by the (80×60) U components in left-to-right, top-to-bottom order.

2. Block Oriented YUV Color Formats a. YVU9_Packed

In YVU9_Planar format, for every (4×4) block of one-byte Y components, there are one one-byte V component and one one-byte U component. For each (4×4) block of the video image, the video data sequence comprises the V component, followed by the U component, followed by the (4×4) Y components in left-to-right, top-to-bottom order. This sequence is repeated for each (4×4) block in the video image in left-to-right, top-to-bottom order.

b. YVU12_Packed

In YVU12_Planar format, for every (2×2) block of one-byte Y components, there are one one-byte V component and one one-byte U component. For each (2×2) block of the video image, the video data sequence comprises the V component, followed by the U component, followed by the (2×2) Y components in left-to-right, top-to-bottom order. This sequence is repeated for each (2×2) block in the video image in left-to-right, top-to-bottom order.

3. Interleaved YUV Color Formats a. YUV422_Packed

In $YUV_{422}$_Packed format, for every (1×2) block of one-byte Y components (i.e., for each horizontal pair of Y components), there are one one-byte V component and one one-byte U component. For each (1×2) block of the video image, the video data sequence comprises the left Y component, followed by the U component, followed by the right Y component, followed by the V component. This sequence is repeated for each (1×2) block in the video image in left-to-right, top-to-bottom order.

b. YUV411_Packed

In YUV411_Packed format, for every (1×4) block of one-byte Y components (i.e., for each horizontal run of four Y components), there are one one-byte V component and one one-byte U component. For each (1×4) block of the video image, the video data sequence comprises eight bytes (bytes 0–7 where byte 0 is the first byte in the sequence). Bytes 0, 2, 4, and 6 contain the four Y components from left to right.

The first and second most significant bits (MSBs) in byte 1 contain the first and second MSBs of the U component, respectively. The third and fourth MSBs in byte 1 contain the first and second MSBs of the V component, respectively.

The first and second MSBs in byte 3 contain the third and fourth MSBs of the U component, respectively. The third and fourth MSBs in byte 3 contain the third and fourth MSBs of the V component, respectively.

The first and second MSBs in byte 5 contain the fifth and sixth MSBs of the U component, respectively. The third and fourth MSBs in byte 3 contain the fifth and sixth MSBs of the V component, respectively.

The first and second MSBs in byte 7 contain the seventh and eighth MSBs of the U component, respectively. The third and fourth MSBs in byte 7 contain the seventh and eighth MSBs of the V component, respectively.

The fifth, sixth, seventh, and eighth MSBs (i.e., the lower bits) of bytes 1, 3, 5, and 7 are "don't care" bits that are preferably equal to zero.

G. Incorporated References

Computer graphics and video processing operations and principles such as capture, compression, decompression, clipping, chromakeying, stretching, scaling, and the various color formats are described in further detail in:

Foley, van Dam, Feiner, and Hughes, *Computer Graphics Principles and Practice,* 2nd edition, Addison Wesley, 1990 (ISBN 0-201-12110-7);

Luther, *Digital Video in the PC Environment,* 2nd edition, McGraw-Hill Book Company, 1991 (ISBN 0-07-039176-9); and "Encoding Parameters of Digital Television for Studios," CCIR Recommendation 601, XVth Plenary Assembly, Geneva, 1982, which are incorporated in their entireties herein by reference.

The operations and programming of the Intel® 386 processor are described in further detail in:

80386 *System Software Writer's Guide,* Intel® Corp. 1987, Intel® Order Number 231499;

80386 *Programmer's Reference Manual,* Intel® Corp. 1987, Intel® Order Number 230985; and

*Introduction to the* 80386, Intel® Corp. 1987, Intel® Order Number 231252, which are incorporated in their entireties herein by reference.

The operations and programming of Microsoft® Windows and Video for Windows are described in further detail in:

Microsoft® *Windows Software Development Kit Version* 3.1, Microsoft® Corp., 1987–1992 and Microsoft® *Video for Windows User's Guide,* Microsoft® Corp., 1992, respectively, which are incorporated in their entireties herein by reference.

The computer language C is described in further detail in Harbison and Steele, *C—A Reference Manual,* 3rd edition, Prentice Hall, 1991 (ISBN 0-13-11-941-3), which is incorporated in its entirely herein by reference.

H. Advantages and Alternative Preferred Embodiments

Those skilled in the art will understand the present invention improves video display quality by:

Transmitting high quality YUV image data to image display subsystems that support conversion of YUV data for display;

Supporting direct access by the image generation subsystem to the IDS memory;

Extracting maximum use of the underlying capabilities of the IDS by supporting a variety of color format support (from CLUT8 to YUV9), direct or indirect non-GDI access, and with or without window management;

Permitting improvement of the IDS without worrying about losing compatibility with the IGS;

Off-loading color conversion from the IGS to the IDS;

Removing the need for IDS-specific code in the IGS, thereby making the IGS compatible with a variety of display memory architectures;

Reducing IGS code and processing requirements; and

Providing reduced data transfer by taking advantage of temporal redundancy in video image by only transferring those pixels that need to be updated.

These advantages of the present invention combine to accelerate video processing, thereby providing higher quality video displays.

In alternative preferred embodiments, video systems according to the present invention have windows systems other than Microsoft® Video for Window running in the Microsoft® Windows 3.X environment, such as IBM OS/2 and Microsoft® NT. Moreover, alternative preferred embodiments of the present invention may be used to display images other than video images, such as graphics, still images, and 3D graphics.

It will also be understood that alternative preferred video systems may be designed to capture and display raw captured image data using the enhanced interface of the present invention. In addition, alternative preferred video systems may capture, compress, decompress, and display commanded image data using the enhanced interface to provide monitoring of compression processing.

It will also be understood that alternative embodiments of the software of video systems according to the present invention may have configurations different from that of FIG. 3. For example, There may be one or more application programs in addition to application 302;

There may be other or additional system-level modules other than GDI 304 and MCIAVI 308;

There may be one or more image generation subsystems in addition to IGS 310;

Application 302 may communicate directly with IGS 310 without going through the windows system layer; and/or Application 302 may be an image generation subsystem that communicates with IDS 306 via the enhanced interface without going through either the windows system layer or a separate IGS.

Those skilled in the art will understand that the present invention may be implemented in computer systems other than PC systems, such as workstations, mini-computers, microcomputers, main frame computers, personal digital assistance (PDA) devices, and personal information appliances (PIA).

It will also be understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for processing image signals, comprising the steps of:

(a) interrogating an image display subsystem of a computer system with an image generation subsystem of the computer system to determine image display subsystem capabilities for at least one of (1) a plurality of different types of color format support, (2) a plurality of different types of access to a memory of the image display subsystem, and (3) a plurality of different types of window management, wherein:

the computer system comprises the image generation subsystem, a media control interface, a graphic-device interface (GDI), and the image display subsystem;

the image display subsystem capabilities may change after the computer system boots up;

the image generation subsystem is electrically connected directly to each of the media control interface, the graphic-device interface, and the image display subsystem;

the media control interface is electrically connected to the graphic-device interface; and the graphic-device interface is electrically connected to the image display subsystem;

(b) generating image signals with the image generation subsystem in accordance with results of the interrogation;

(c) transmitting the image signals from the image generation subsystem to the image display subsystem memory; and (d) displaying the image signals.

2. The process of claim 1, wherein:

the image display subsytem capabilities comprise access to the image display subsystem memory using a direct access mode; and step (c) comprises the step of transmitting the image signals from the image generation subsystem to the image display subsystem memory using the direct access mode.

3. The process of claim 2, wherein step (c) comprises the step of transmitting the image signals using a function to access the image display subsystem memory directly.

4. The process of claim 1, wherein step (c) comprises the steps of:

(1) transmitting source image information and destination window information from the image generation subsystem to the image display subsystem;

(2) configuring the image display subsystem memory with the image display subsystem in accordance with the source image information and the destination window information;

(3) transmitting display memory addressing parameters from the image display subsystem to the image generation subsystem; and (4) transmitting the image signals from the image generation subsystem to the image display subsystem memory in accordance with the display memory addressing parameters.

5. The process of claim 4, wherein steps (c)(1) and (c)(3) comprise the step of transmitting the image signals using a function to access the image display subsystem memory directly.

6. The process of claim 1, wherein:

the image display subsystem capabilities comprise access to the image display subsystem memory using an indirect non-graphic-device interface (non-GDI) access mode; and step (c) comprises the step of transmitting the image signals from the image generation subsystem to the image display subsystem memory using the indirect non-GDI access mode.

7. The process of claim 6, wherein step (c) comprises the step of transmitting the image signals using a function to access the image display subsystem memory indirectly via a non-graphic-device interface path.

8. The process of claim 1, wherein step (c) comprises the steps of:

(1) storing the image signals in a memory of the image generation subsystem with the image generation subsystem;

(2) transmitting image generation subsystem memory addressing parameters from the image generation subsystem to the image display subsystem; and (3) reading the image signals in the image generation subsystem memory with the image display subsystem in accordance with the image generation subsystem memory addressing parameters.

9. The process of claim 8, wherein step (c)(2) comprises the step of transmitting the image generation subsystem memory addressing parameters using a function to access the image display subsystem memory indirectly via a non-graphic-device interface path.

10. The process of claim 1, wherein:

step (a) comprises the step of interrogating the image display subsystem with the image generation subsystem to determine one or more supported display access modes supported by the image display subsystem; and step (c) comprises the step of transmitting the image signals from the image generation subsystem to the image display subsystem memory using a supported display access mode of the one or more supported display access modes.

11. The process of claim 10, wherein the one or more supported display access modes comprises at least one of direct access mode, indirect non-graphic-device interface (non-GDI) access mode, and GDI access mode.

12. The process of claim 10, wherein step (a) comprises the step of interrogating the image display subsystem with the image generation subsystem to determine the one or more supported display access modes supported by the image display subsystem using a function to query the image display subsystem for display access options.

13. The process of claim 1, wherein:
   step (a) comprises the step of interrogating the image display subsystem with the image generation subsystem to determine one or more supported color formats supported by the image display subsystem; and
   step (b) comprises the step of converting image signals in an original color format with the image generation subsystem to generate image signals in a supported color format of the one or more supported color formats, if the original color format is not one of the supported color formats.

14. The process of claim 13, wherein the one or more supported color formats comprise at least one of YVU9_Planar, YUV411_Packed, YVU12_Planar, YUV422_Packed, RGB8_CLUT, RGB16_555, RGB16_565, RGB24_888, YVU9_Packed, YVU12_Packed, RGB32, Alpha1, and Alpha8 color formats.

15. The process of claim 13, wherein step (a) comprises the step of interrogating the image display subsystem with the image generation subsystem to determine the one or more supported color formats supported by the image display subsystem using a function to query the image display subsystem for a list of supported color formats.

16. The process of claim 13, wherein step (d) comprises the steps of:
   (1) converting the image signals to generate image signals in a display color format with the image display subsystem; and
   (2) displaying the image signals in the display color format with the image display subsystem.

17. The process of claim 13, wherein the original color format is a YUV color format.

18. The process of claim 1, wherein step (a) comprises the step of interrogating the image display subsystem with the image generation subsystem to determine whether the image display subsystem supports at least one of clipping, chromakeying, and stretching.

19. The process of claim 18, wherein step (a) comprises the step of determining whether the image display subsystem supports clipping using a function to query the image display subsystem for clipping support options.

20. The process of claim 18, wherein:
   step (a) comprises the step of determining that the image display subsystem supports clipping and that the image display subsystem needs a clip list from the image generation subsystem;
   step (c) comprises the steps of:
      (1) generating a clip list with the image generation subsystem;
      (2) making the clip list available to the image display subsystem with the image generation subsystem; and
      (3) transmitting the image signals from the image generation subsystem to the image display subsystem memory; and
   step (d) comprises the step of displaying the image signals with the image display subsystem in accordance with the clip list.

21. The process of claim 20, wherein step (c)(2) comprises the step of using a function to pass a clip list to the image display subsystem.

22. The process of claim 18, wherein:
   step (a) comprises the step of determining that the image display subsystem supports clipping and that the image display subsystem does not need a clip list from the image generation subsystem; and
   step (d) comprises the steps of:
      (1) generating a clip list with the image display subsystem; and
      (2) displaying the image signals with the image display subsystem in accordance with the clip list.

23. The process of claim 18, wherein step (a) comprises the step of determining whether the image display subsystem supports chromakeying using a function to query the image display subsystem for chromakeying color format.

24. The process of claim 18, wherein step (a) comprises the step of determining that the image display subsystem supports chromakeying using one or more supported chromakey color formats.

25. The process of claim 24, wherein the one or more supported chromakey color formats comprise at least one of the RGB8_CLUT, RGB16_555, RGB16_565, RGB24_888, RGB32, Alpha1, and Alpha8 color formats.

26. The process of claim 18, wherein step (a) comprises the step of determining whether the image display subsystem supports stretching using a function to query the image display subsystem for stretching options.

27. The process of claim 18, wherein:
   step (a) comprises the step of determining that the image display subsystem supports stretching in the X axis only; and
   step (d) comprises the steps of:
      (1) performing X axis only stretching on the image signals with the image display subsystem to generate stretched image signals; and
      (2) displaying the stretched image signals with the image display subsystem.

28. The process of claim 18, wherein:
   step (a) comprises the step of determining that the image display subsystem supports stretching in both the X and Y axes; and
   step (d) comprises the steps of:
      (1) performing X and Y axis stretching on the image signals with the image display subsystem to generate stretched image signals; and
      (2) displaying the stretched image signals with the image display subsystem.

29. The process of claim 1, wherein: step (a) comprises the steps of:
   (1) interrogating the image display subsystem with the image generation subsystem to determine one or more supported display access modes supported by the image display subsystem using a function to query the image display subsystem for display access options, wherein the one or more supported display access modes comprises at least one of direct access mode, indirect non-graphic-device interface (non-GDI) access mode, and GDI access mode;
   (2) interrogating the image display subsystem with the image generation subsystem to determine one or more supported color formats supported by the image display subsystem using a function to query the image display subsystem for a list of supported color formats, wherein the one or more supported color formats comprise at least one of YVU9_Planar, YUV411_Packed, YVU12_Planar, YUV422_Packed, RGB8_CLUT, RGB16_555, RGB16_565, RGB24_888, YVU9_Packed, YVU12_Packed, RGB 32, Alpha1, and Alpha8 color formats;
   (3) interrogating the image display subsystem with the image generation subsystem to determine whether the image display subsystem supports clipping using a function to query the image display subsystem for clipping support options;

(4) interrogating the image display subsystem with the image generation subsystem to determine whether the image display subsystem supports chromakeying using a function to query the image display subsystem for chromakeying color format, wherein the image display subsystem supports chromakeying using one or more supported chromakey color formats and the one or more supported chromakey color formats comprise at least one of the RGB8_CLUT, RGB16_555, RGB16_565, RGB24_888, RGB 32, Alpha1, and Alpha8 color formats; and (5) interrogating the image display subsystem with the image generation subsystem to determine whether the image display subsystem supports stretching using a function to query the image display subsystem for stretching options, wherein the image display subsystem supports one of stretching in the X axis only, stretching in both the X and Y axes, and no stretching;

step (b) comprises the step of converting image signals in an original color format with the image generation subsystem to generate image signals in a supported color format of the one or more supported color formats, wherein the original color format is a YUV color format;

step (c) comprises the step of transmitting the image signals in the supported color format from the image generation subsystem to the image display subsystem memory using one of the direct access mode using a function to access the image display subsystem memory directly, the indirect non-GDI access mode using a function to access the image display subsystem memory indirectly via a non-GDI path, and the GDI access mode; and step (d) comprises the steps of:

(1) converting the image signals in the supported color format to generate image signals in a display color format with the image display subsystem; and (2) displaying the image signals in the display color format with the image display subsystem.

30. A computer system for processing image signals, comprising:

(a) an image generation subsystem;

(b) a media control interface;

(c) a graphic-device interface; and (d) an image display subsystem, wherein:

the image generation subsystem is electrically connected directly to each of the media control interface, the graphic-device interface (GDI), and the image display subsystem;

the image display subsystem capabilities may change after the computer system boots up;

the media control interface is electrically connected to the graphic-device interface;

the graphic-device interface is electrically connected to the image display subsystem;

the image generation subsystem interrogates the image display subsystem to determine image display subsystem capabilities for at least one of (1) a plurality of different types of color format support, (2) a plurality of different types of access to a memory of the image display subsystem, and (3) a plurality of different types of window management;

the image generation subsystem generates image signals in accordance with results of the interrogation;

the image generation subsystem makes the image signals available for transmission to the image display subsystem memory; and the image display subsystem displays the image signals.

31. The system of claim 30, wherein:

the image display subsystem capabilities comprise access to the image display subsystem memory using a direct access mode; and the image generation subsystem transmits the image signals to the image display subsystem memory using the direct access mode.

32. The system of claim 31, wherein the image generation subsystem uses a function to access the image display subsystem memory directly to transmit the image signals to the image display subsystem memory.

33. The system of claim 30, wherein:

the image generation subsystem transmits source image information and destination window information to the image display subsystem;

the image display subsystem configures the image display subsystem memory in accordance with the source image information and the destination window information;

the image display subsystem transmits display memory addressing parameters to the image generation subsystem; and the image generation subsystem transmits the image signals to the image display subsystem memory in accordance with the display memory addressing parameters.

34. The system of claim 33, wherein the image generation subsystem transmits the image signals using a function to access the image display subsystem memory directly.

35. The system of claim 30, wherein:

the image display subsystem capabilities comprise access to the image display subsystem memory using an indirect non-graphic-device interface (non-GDI) access mode; and the image generation subsystem transmits the image signals to the image display subsystem memory using the indirect non-GDI access mode.

36. The system of claim 35, wherein the image generation subsystem transmits the image signals using a function to access the image display subsystem memory indirectly via a non-graphic-device interface path.

37. The system of claim 30, wherein:

the image generation subsystem stores the image signals in a memory of the image generation subsystem;

the image generation subsystem transmits image generation subsystem memory addressing parameters to the image display subsystem; and the image display subsystem reads the image signals in the image generation subsystem memory in accordance with the image generation subsystem memory addressing parameters.

38. The system of claim 37, wherein the image generation subsystem transmits the image generation subsystem memory addressing parameters using a function to access the image display subsystem memory indirectly via a non-graphic-device interface path.

39. The system of claim 30, wherein:

the image generation subsystem interrogates the image display subsystem to determine one or more supported display access modes supported by the image display subsystem; and the image generation subsystem transmits the image signals to the image display subsystem memory using a supported display access mode of the one or more supported display access modes.

40. The system of claim 39, wherein the one or more supported display access modes comprises at least one of direct access mode, indirect non-graphic-device interface (non-GDI) access mode, and GDI access mode.

41. The system of claim 39, wherein the image generation subsystem interrogates the image display subsystem to determine the one or more supported display access modes supported by the image display subsystem using a function to query the image display subsystem for display access options.

42. The system of claim 30, wherein:

the image generation subsystem interrogates the image display subsystem to determine one or more supported color formats supported by the image display subsystem; and the image generation subsystem converts image signals in an original color format to generate image signals in a supported color format of the one or more supported color formats, if the original color format is not one of the supported color formats.

43. The system of claim 42, wherein the one or more supported color formats comprise at least one of YVU9_Planar, YUV411_Packed, YVU12_Planar, YUV422_Packed, RGB8_CLUT, RGB16_555, RGB16_565, RGB24_888, YVU9_Packed, YVU12_Packed, RGB32, Alpha1, and Alpha8 color formats.

44. The system of claim 42, wherein the image generation subsystem interrogates the image display subsystem to determine the one or more supported color formats supported by the image display subsystem using a function to query the image display subsystem for a list of supported color formats.

45. The system of claim 42, wherein:

the image display subsystem converts the image signals to generate image signals in a display color format; and the image display subsystem displays the image signals in the display color format.

46. The system of claim 42, wherein the original color format is a YUV color format.

47. The system of claim 30, wherein the image generation subsystem interrogates the image display subsystem to determine whether the image display subsystem supports at least one of clipping, chromakeying, and stretching.

48. The system of claim 47, wherein the image generation subsystem interrogates the image display subsystem to determine whether the image display subsystem supports clipping using a function to query the image display subsystem for clipping support options.

49. The system of claim 47, wherein:

the image generation subsystem determines that the image display subsystem supports clipping and that the image display subsystem needs a clip list from the image generation subsystem;

the image generation subsystem generates a clip list;

the image generation subsystem makes the clip list available to the image display subsystem;

the image generation subsystem transmits the image signals to the image display subsystem memory; and the image display subsystem displays the image signals in accordance with the clip list.

50. The system of claim 49, wherein the image generation subsystem makes the clip list available to the image display subsystem using a function to pass a clip list to the image display subsystem.

51. The system of claim 47, wherein:

the image generation subsystem determines that the image display subsystem supports clipping and that the image display subsystem does not need a clip list from the image generation subsystem;

the image display subsystem generates a clip list; and the image display subsystem displays the image signals in accordance with the clip list.

52. The system of claim 47, wherein the image generation subsystem determines whether the image display subsystem supports chromakeying using a function to query the image display subsystem for chromakeying color format.

53. The system of claim 47, wherein the image generation subsystem determines that the image display subsystem supports chromakeying using one or more supported chromakey color formats.

54. The system of claim 53, wherein the one or more supported chromakey color formats comprise at least one of the RGB8_CLUT, RGB16_555, RGB16_565, RGB24_888, RGB32, Alpha1, and Alpha8 color formats.

55. The system of claim 47, wherein the image generation subsystem determines whether the image display subsystem supports stretching using a function to query the image display subsystem for stretching options.

56. The system of claim 47, wherein:

the image generation subsystem determines that the image display subsystem supports stretching in the X axis only;

the image display subsystem performs X axis only stretching on the image signals to generate stretched image signals; and the image display subsystem displays the stretched image signals.

57. The system of claim 47, wherein:

the image generation subsystem determines that the image display subsystem supports stretching in both the X and Y axes;

the image display subsystem performs X and Y axis stretching on the image signals to generate stretched image signals; and the image display subsystem displays the stretched image signals.

58. The system of claim 30, wherein:

the image generation subsystem interrogates the image display subsystem to determine one or more supported display access modes supported by the image display subsystem using a function to query the image display subsystem for display access options, wherein the one or more supported display access modes comprises at least one of direct access mode, indirect non-graphic-device interface (non-GDI) access mode, and GDI access mode;

the image generation subsystem interrogates the image display subsystem to determine one or more supported color formats supported by the image display subsystem using a function to query the image display subsystem for a list of supported color formats, wherein the one or more supported color formats comprise at least one of YVU9_Planar, YUV411_Packed, YVU12_Planar, YUV422_Packed, RGB8_CLUT, RGB16_555, RGB16_565, RGB24_888, YVU9_Packed, YVU12_Packed, RGB 32, Alpha1, and Alpha8 color formats;

the image generation subsystem interrogates the image display subsystem to determine whether the image display subsystem supports clipping using a function to query the image display subsystem for clipping support options;

the image generation subsystem interrogates the image display subsystem to determine whether the image display subsystem supports chromakeying using a function to query the image display subsystem for chromakeying color format, wherein the image display subsystem supports chromakeying using one or more, supported chromakey color formats and the one or more supported chromakey color formats comprise at least one of the RGB8_CLUT, RGB16_555, RGB16_565, RGB24_888, RGB 32, Alpha1, and Alpha8 color formats;

the image generation subsystem interrogates the image display subsystem to determine whether the image display subsystem supports stretching using a function to query the image display subsystem for stretching options, wherein the image display subsystem supports one of stretching in the X axis only, stretching in both the X and Y axes, and no stretching;

the image generation subsystem converts image signals in an original color format to generate image signals in a supported color format of the one or more supported color formats, wherein the original color format is a YUV color format;

the image generation subsystem transmits the image signals in the supported color format to the image display subsystem memory using one of the direct access mode using a function to access the image display subsystem memory directly, the indirect non-GDI access mode using a function to access the image display subsystem memory indirectly via a non-GDI path, and the GDI access mode;

the image display subsystem converts the image signals in the supported color format to generate image signals in a display color format; and the image display subsystem displays the image signals in the display color format.

\* \* \* \* \*